Figure 24:
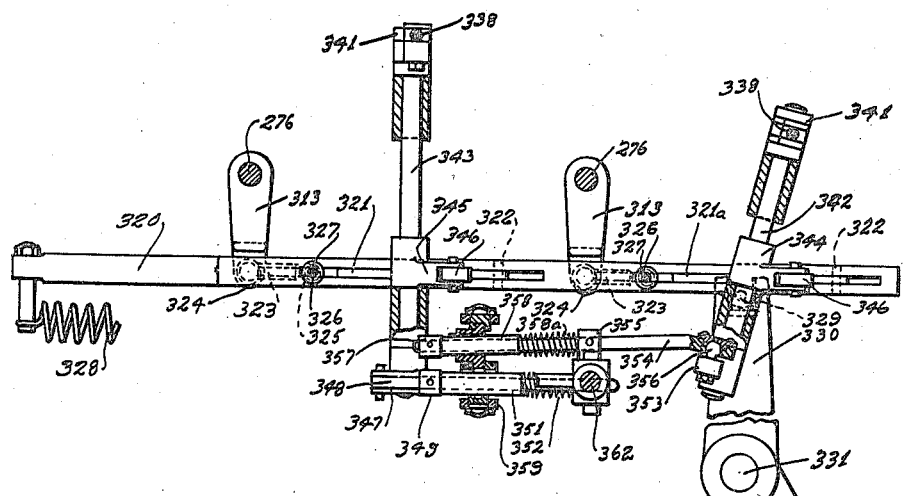

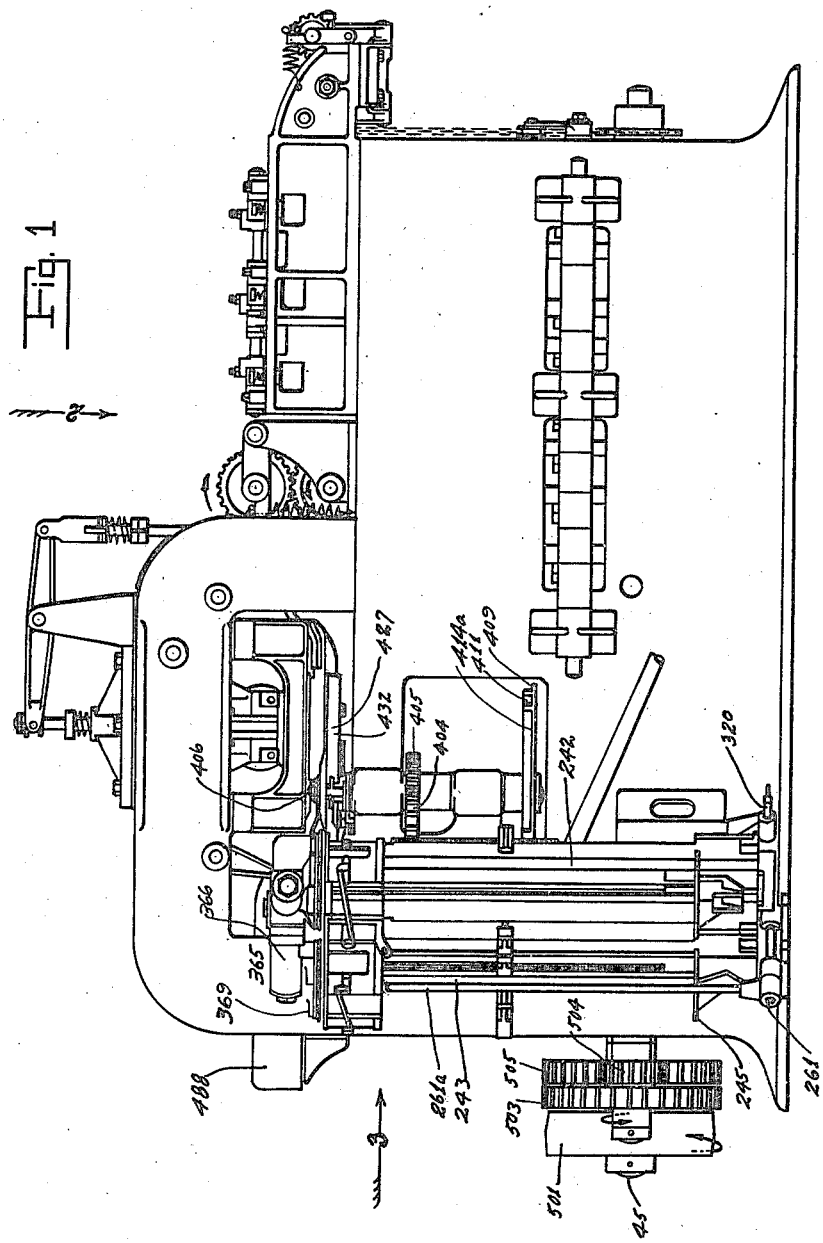

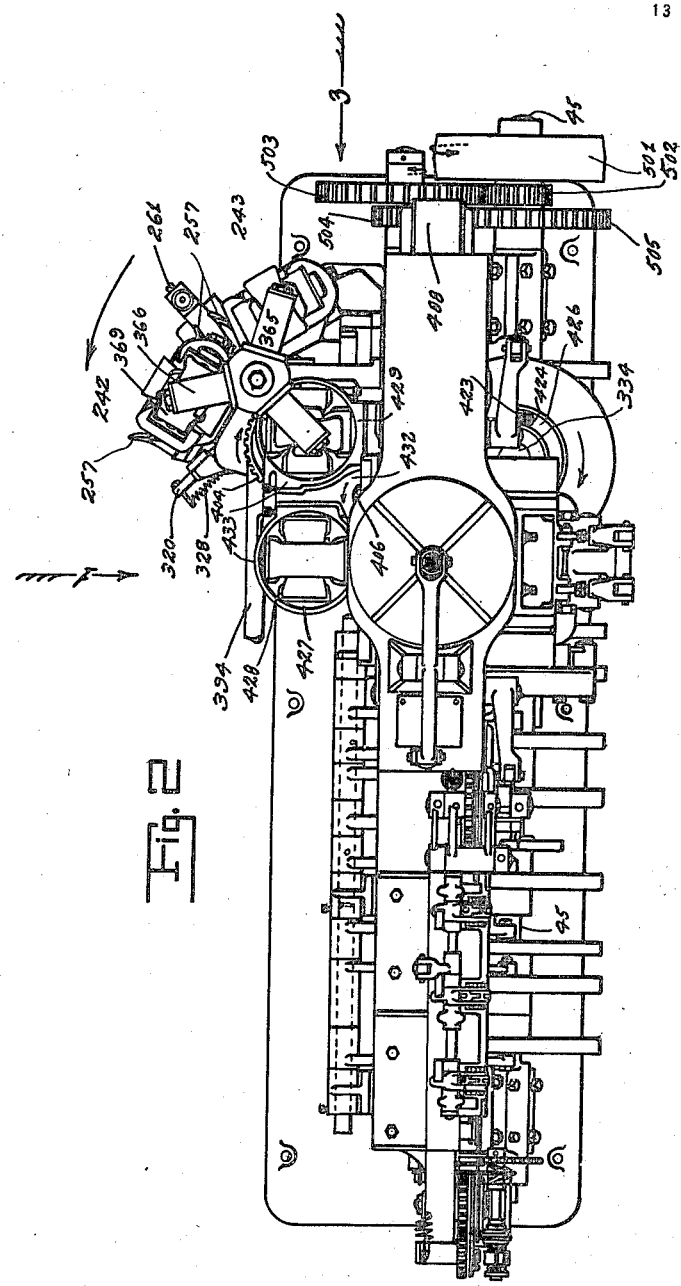

C. BURNHAM.
FEEDING MECHANISM FOR BOX MAKING MACHINES.
APPLICATION FILED NOV. 29, 1912.
1,154,968.
Patented Sept. 28, 1915.
13 SHEETS—SHEET 3.
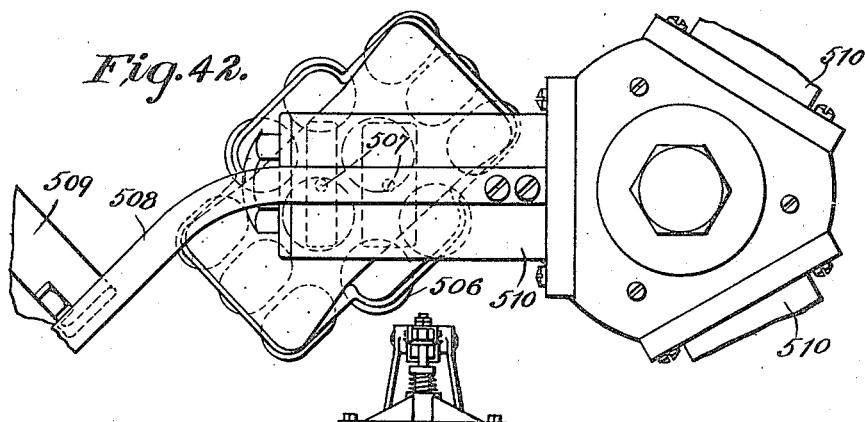
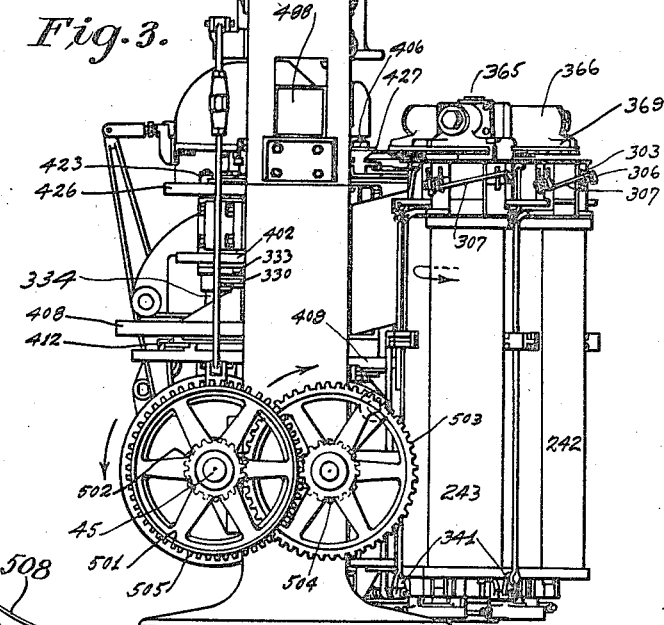
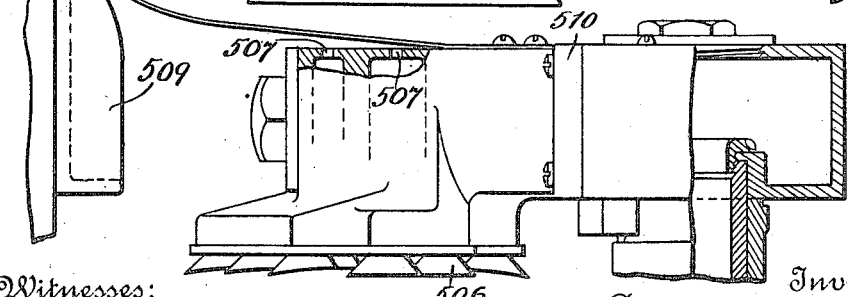
Inventor
Charles Burnham

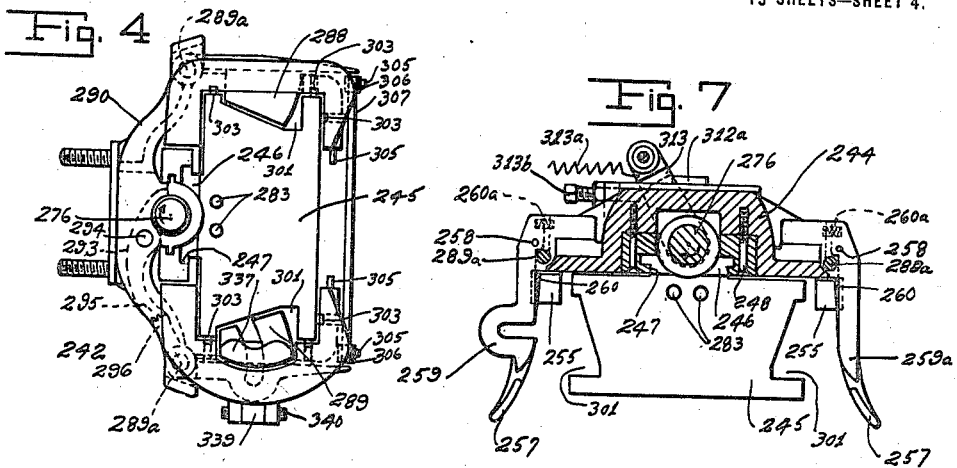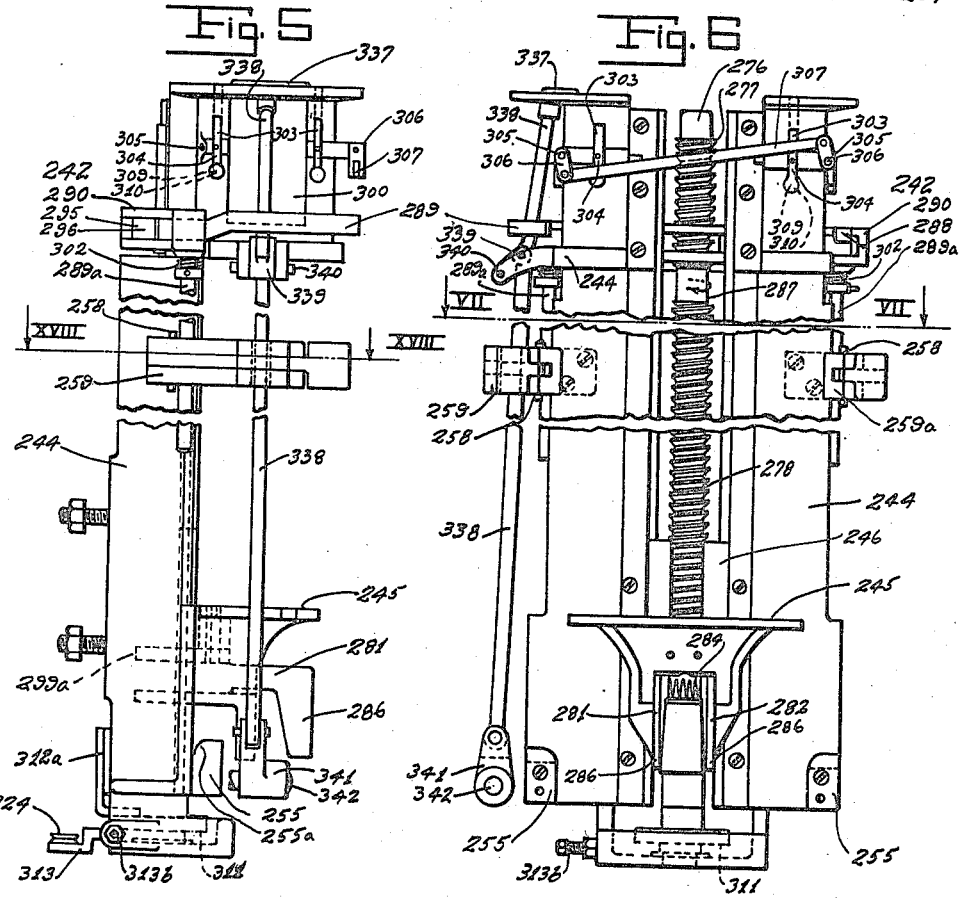

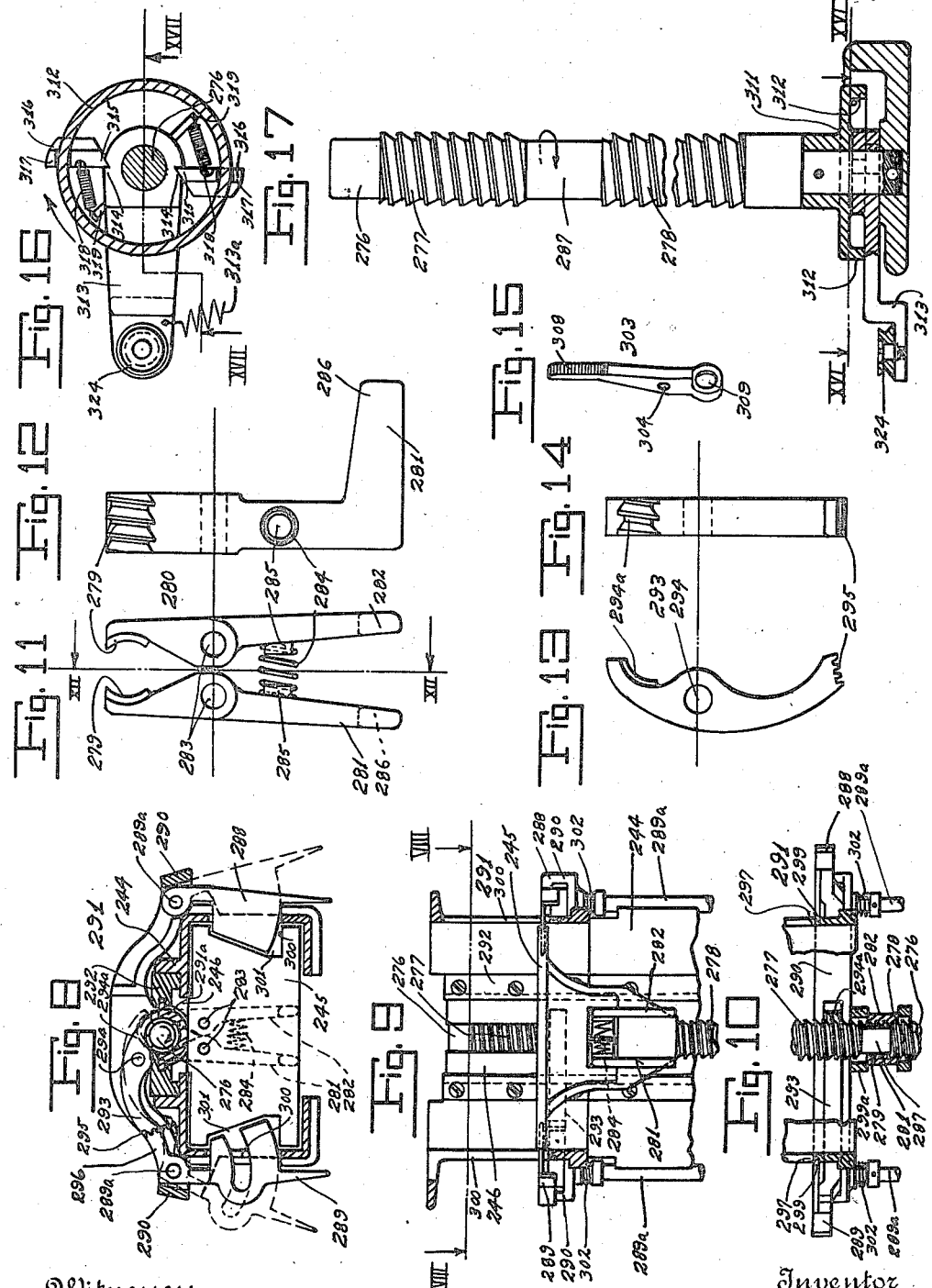

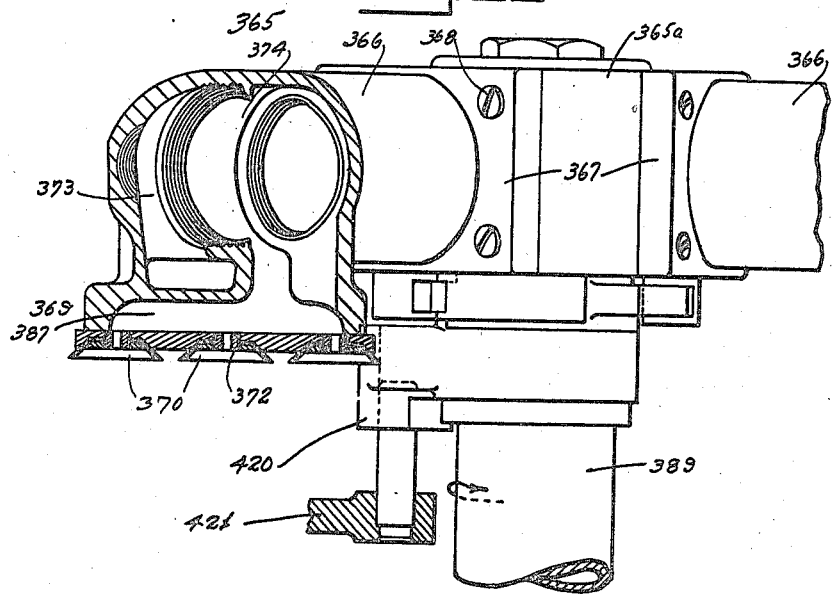
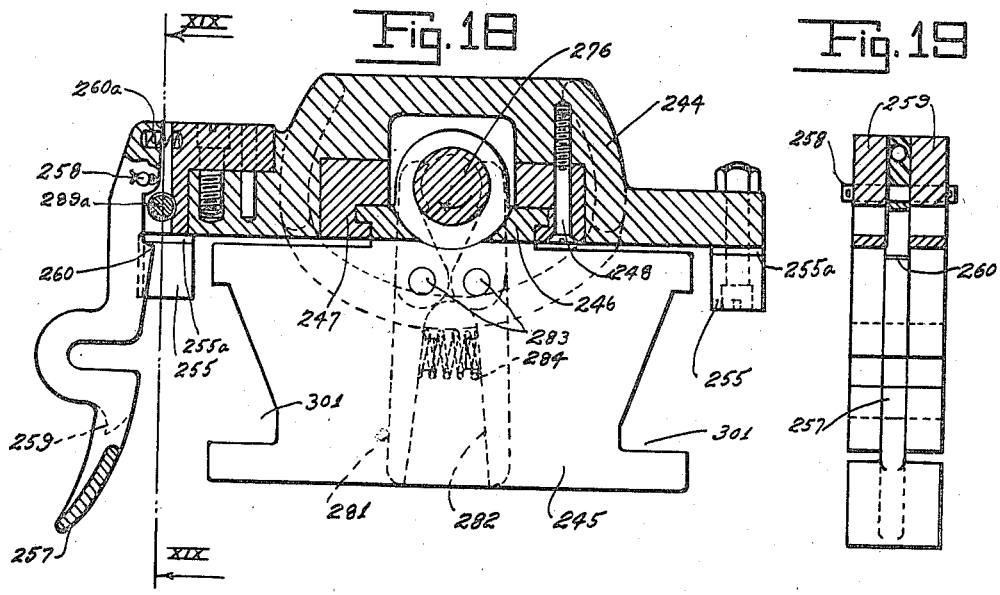

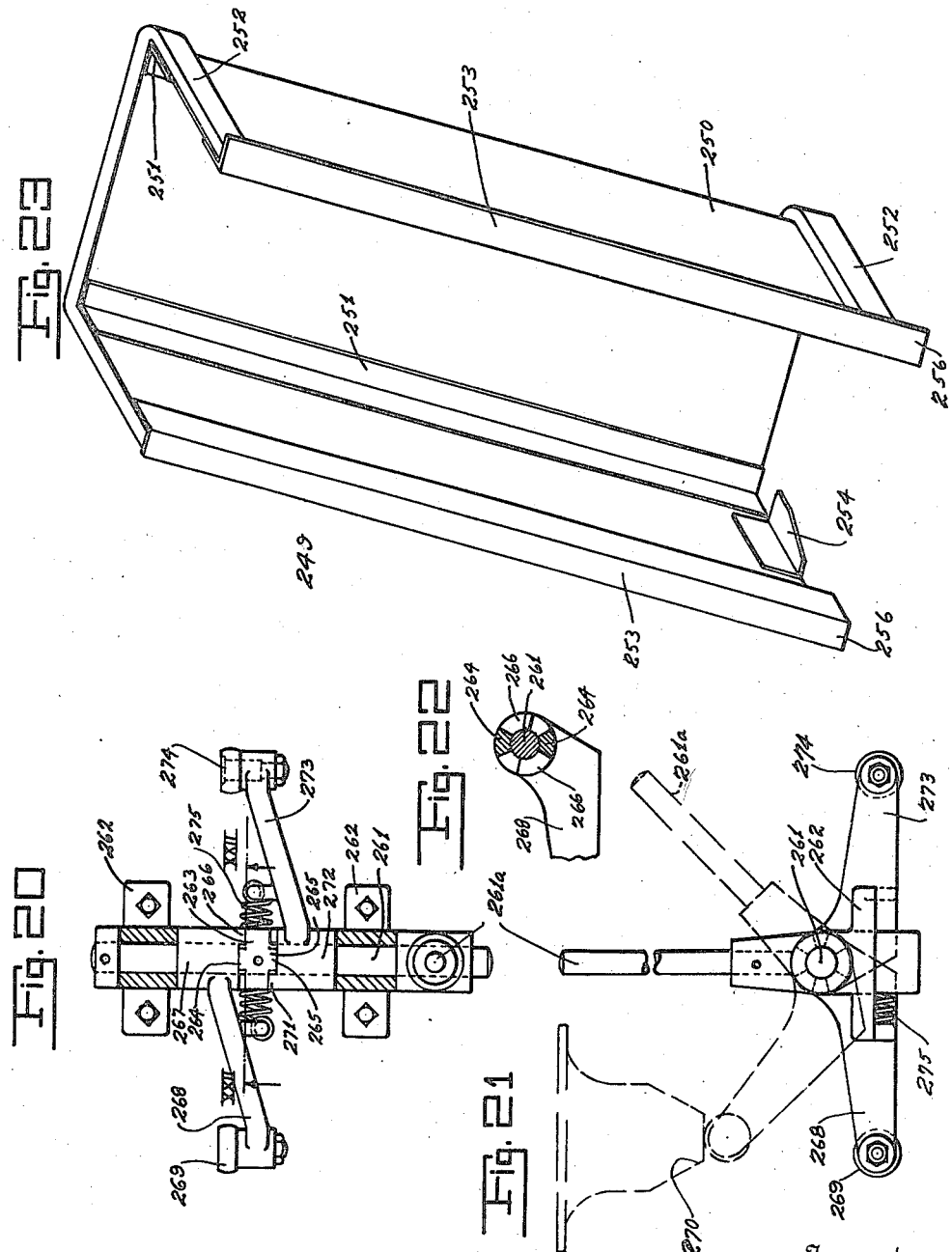

C. BURNHAM.
FEEDING MECHANISM FOR BOX MAKING MACHINES.
APPLICATION FILED NOV. 29, 1912.

1,154,968.

Patented Sept. 28, 1915.
13 SHEETS—SHEET 8.

Witnesses:
C. Bartels
L. L. Mayer

Inventor
Charles Burnham
By his Attorneys
Criswell & Criswell

C. BURNHAM.
FEEDING MECHANISM FOR BOX MAKING MACHINES.
APPLICATION FILED NOV. 29, 1912.
1,154,968. Patented Sept. 28, 1915.
13 SHEETS—SHEET 9.
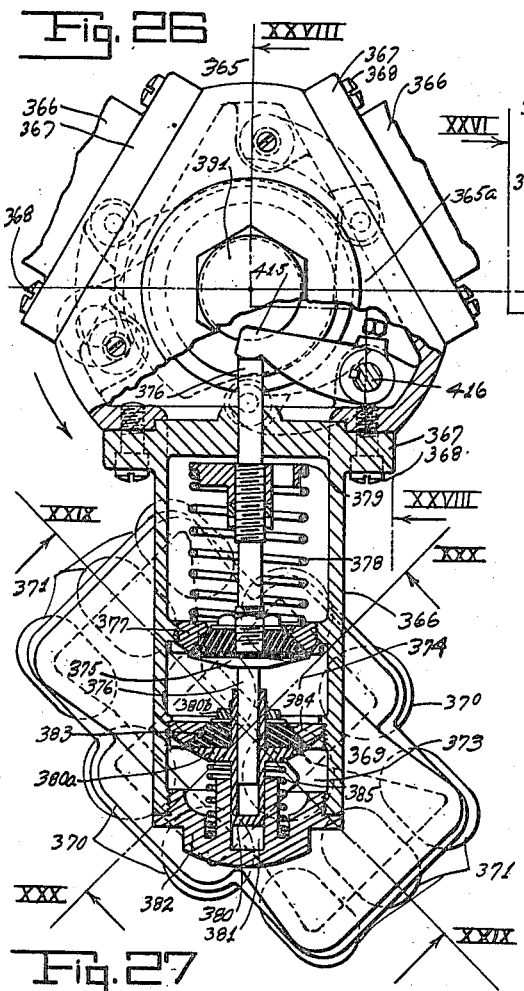
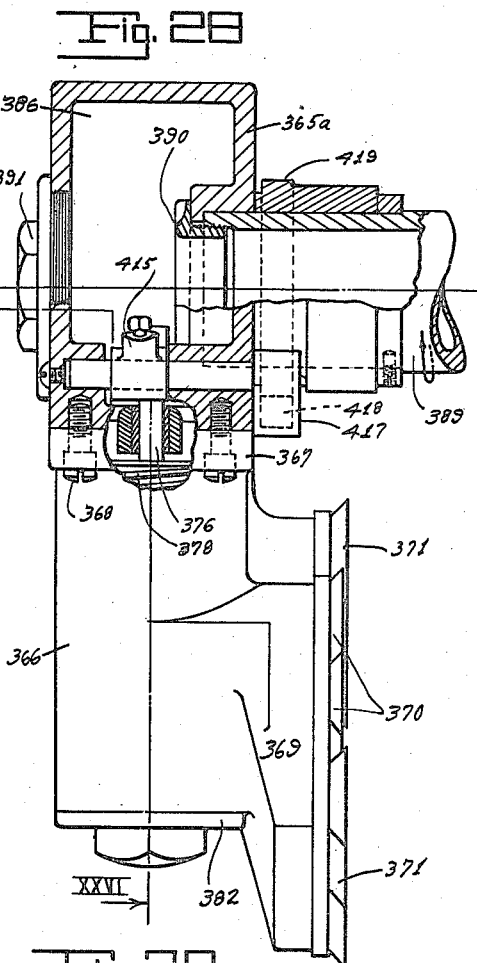
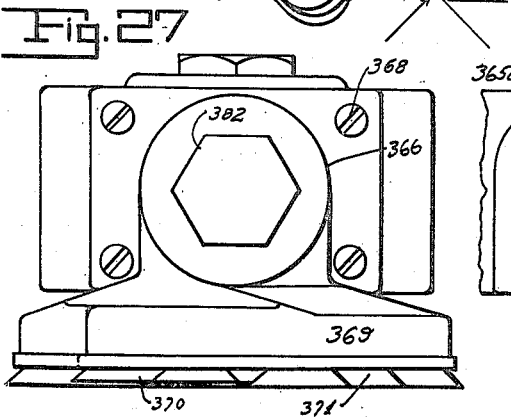
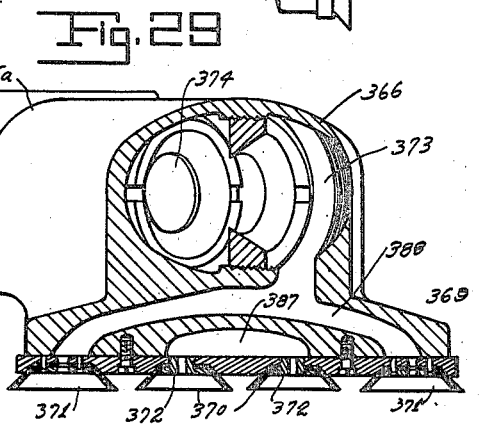
Inventor
Charles Burnham
By his Attorneys C. BURNHAM.
FEEDING MECHANISM FOR BOX MAKING MACHINES.
APPLICATION FILED NOV. 29, 1912.

1,154,968.

Patented Sept. 28, 1915.
13 SHEETS—SHEET 10.

Witnesses:
C. Bartels
L. C. Mayer

Inventor
Charles Burnham
By his Attorneys

C. BURNHAM.
FEEDING MECHANISM FOR BOX MAKING MACHINES.
APPLICATION FILED NOV. 29, 1912.
1,154,968.
Patented Sept. 28, 1915.
13 SHEETS—SHEET 11.
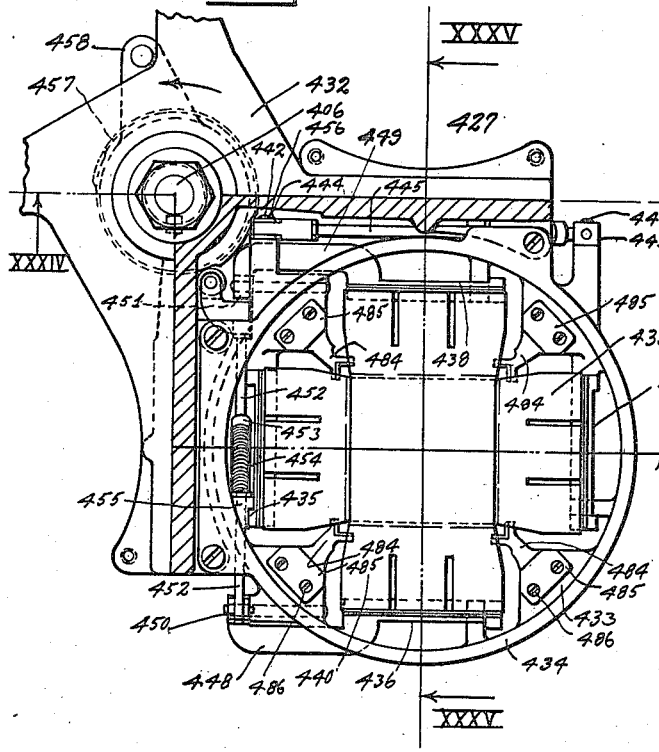
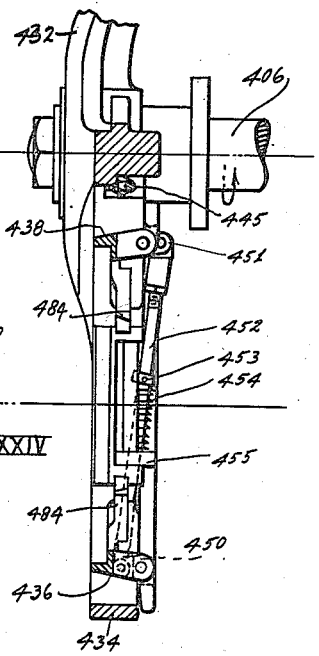
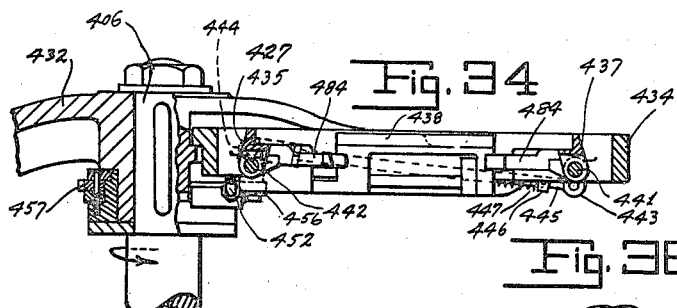
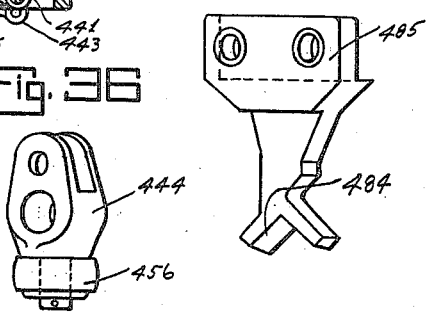
Witnesses:
Inventor
Charles Burnham
By his Attorneys

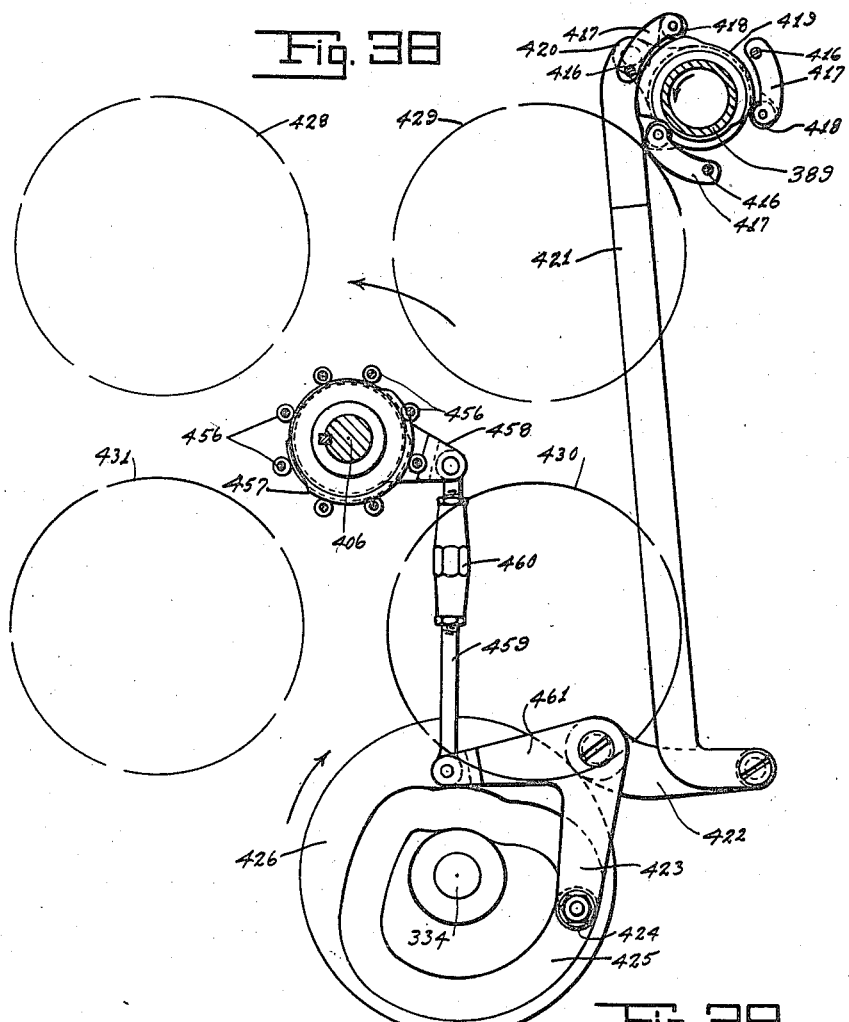
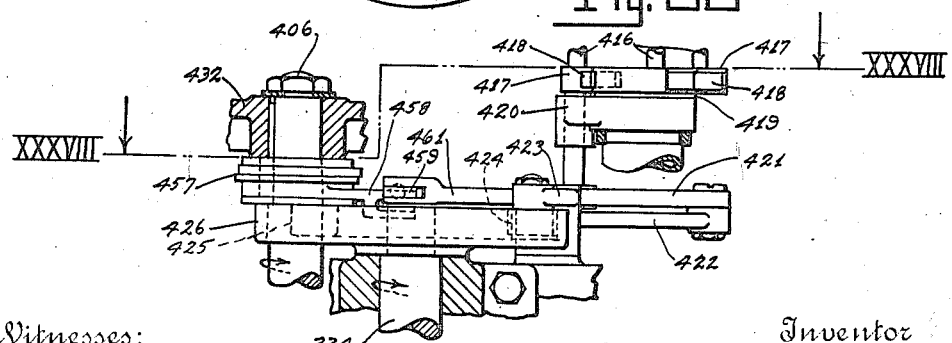

C. BURNHAM.
FEEDING MECHANISM FOR BOX MAKING MACHINES.
APPLICATION FILED NOV. 29, 1912.

1,154,968.

Patented Sept. 28, 1915.
13 SHEETS—SHEET 13.

Witnesses:

Inventor
Charles Burnham
By his Attorneys

UNITED STATES PATENT OFFICE.

CHARLES BURNHAM, OF LOS ANGELES, CALIFORNIA, ASSIGNOR TO BURNHAM BASKET COMPANY, A CORPORATION OF CALIFORNIA.

FEEDING MECHANISM FOR BOX-MAKING MACHINES.

1,154,968.  Specification of Letters Patent.  Patented Sept. 28, 1915.

Application filed November 29, 1912. Serial No. 734,156.

*To all whom it may concern:*

Be it known that I, CHARLES BURNHAM, a citizen of the United States, and a resident of Los Angeles, county of Los Angeles, and State of California, have invented certain new and useful Improvements in Feeding Mechanism for Box-Making Machines, of which the following is a full, clear, and exact description.

This invention relates more particularly to the feed mechanism of basket or box machinery in which boxes or like containers for berries, or other fruit are made from thin body material.

One of the main objects of the invention is to provide simple and efficient mechanism whereby shooks may be fed automatically from one or more holders and the shooks positioned and conveyed to mechanism which takes the shooks thus positioned and conveyed and shapes the same to form the box or container body.

Another object of the invention is to provide simple and efficient feed mechanism for the shooks of which the box body is made, and to provide means whereby a large number of shooks may be readily placed in position to be fed to suitable box-forming means.

Other objects of the invention are to provide simple and efficient means for detachably holding the shook-holding magazines in order that a large number of the shooks may be held; to provide simple means for automatically feeding the shooks; to provide simple means for automatically stopping the shook feed mechanism in case the feed should be too rapid; and to provide simple and efficient pneumatic means whereby the shooks may be automatically removed from a plurality of magazines and the shooks arranged crosswise and automatically discharged into a carrier to be fed to the box-making mechanism.

A further object of the invention is to provide simple and efficient means for receiving the shooks and conveying them crosswise in position to have the box body formed and to receive the box body after the same has been made.

With these and other objects in view, the invention will be hereinafter more particularly described with reference to the accompanying drawings, which form a part of this specification, and will then be pointed out in the claims at the end of the description.

Figure 25:
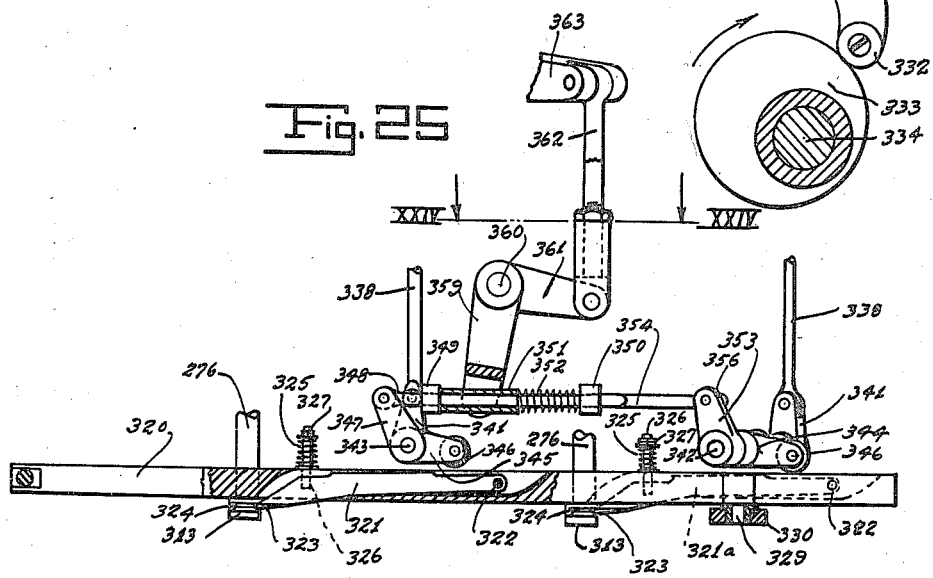
Figure 31:
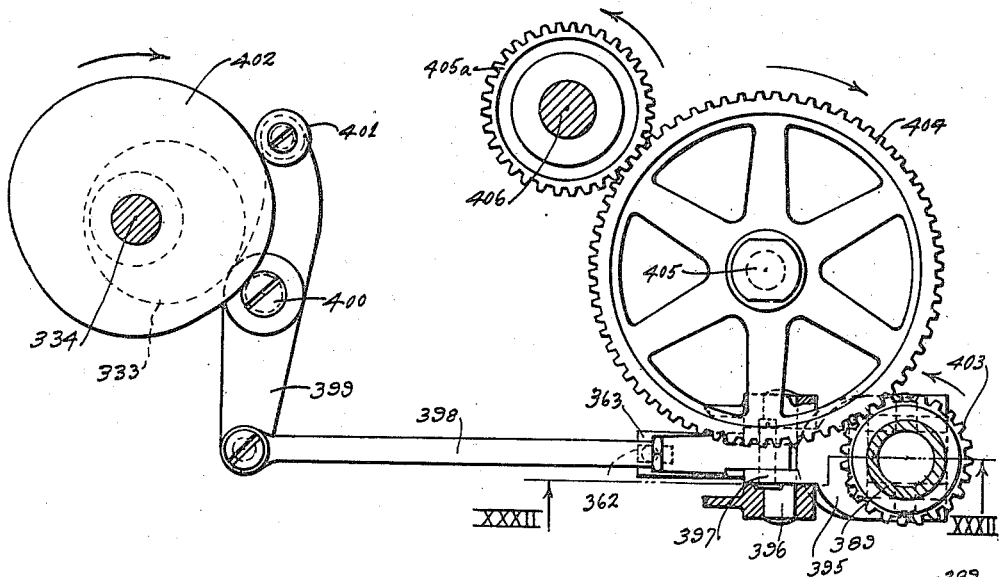
Figure 32:
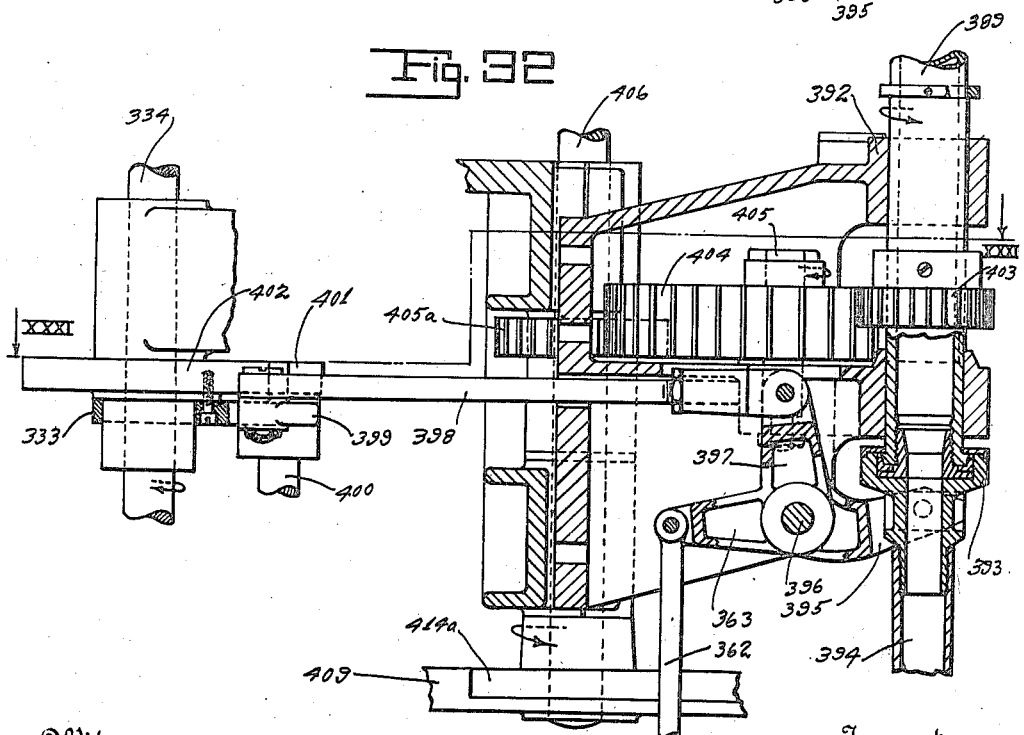
Figure 40:
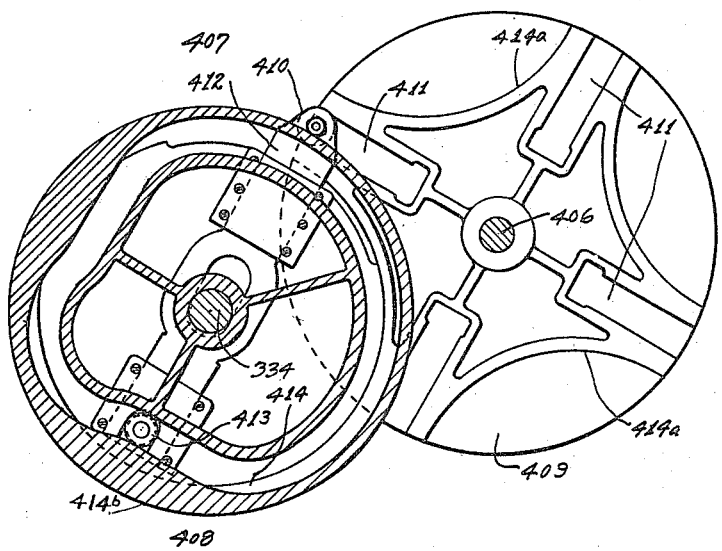
Figure 41:
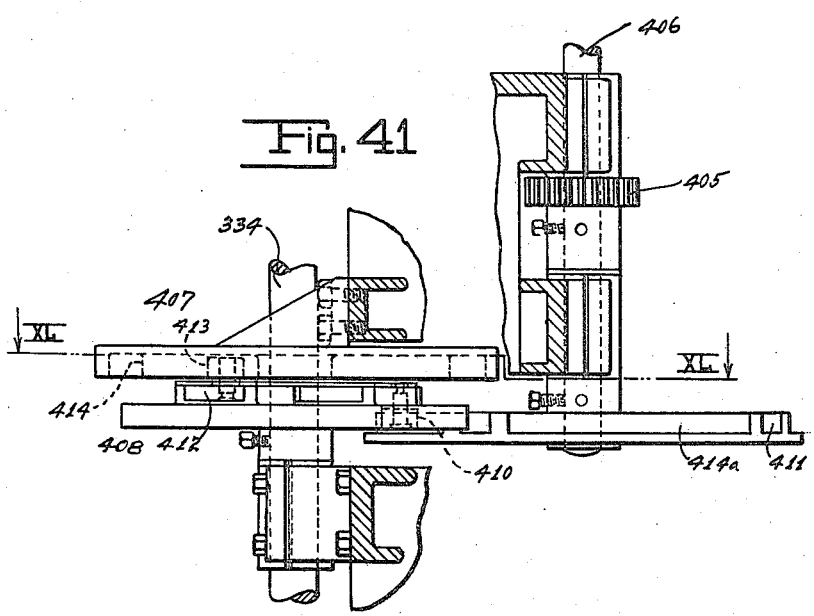

In the drawings, Figure 1 is a side elevation of one form of machine embodying my invention, looking in the direction of arrow I of Fig. 2. Fig. 2 is a plan view indicated by arrow II of Fig. 1. Fig. 3 is an end elevation, showing the shook magazines and looking in the direction of arrow III of Figs. 1 and 2. Fig. 4 is a top plan view of one of the shook magazines detached from the machine. Fig. 5 is an elevation of one of the magazine frames. Fig. 6 is a front elevation of the frame shown in Fig. 5. Fig. 7 is a sectional plan view taken on the line VII—VII of Fig. 6. Fig. 8 is a sectional plan view taken on the line VIII—VIII of Fig. 9 of the magazine frame. Fig. 9 is a fragmentary view, partly in section and partly in elevation, of the upper part of the magazine frame. Fig. 10 is a fragmentary sectional view, partly in elevation, of the upper part of the magazine frame showing the auxiliary feed for the shooks when the magazine holding member is being placed in position. Fig. 11 is a plan view of a part of the follower feed of the magazine. Fig. 12 is an elevation looking in the direction of line XII—XII of Fig. 11. Fig. 13 is a detail of one member of the auxiliary feed located at the upper part of the magazine. Fig. 14 is a side elevation of Fig. 13. Fig. 15 is a detail perspective of one of the fingers or devices for engaging the edges of the shooks in the magazines. Fig. 16 is a sectional plan, partly in elevation, taken on the line XVI—XVI of Fig. 17, showing the means for rotating the follower feed screw. Fig. 17 is a detail of the feed screw for the shooks, showing in section the part of the means for intermittently rotating said screw. Fig. 18 is a sectional plan through one of the magazines, taken on the line XVIII—XVIII of Fig. 5. Fig. 19 is a sectional view taken on the line XIX—XIX of Fig. 18. Fig. 20 is a plan view, partly in elevation, showing one form of means for lifting the followers within the magazines after the shooks are in position to be fed. Fig. 21 is a side elevation, partly broken away, of the operating lever shown in Fig. 20. Fig. 22 is a transverse section taken on the line XXII—XXII of Fig. 20 showing how the operating lever rocks the shaft in either direction so that either follower of either of the magazines may be forced upward. Fig. 23 is a detail perspective view of one of the magazine holders. Fig. 24 is a plan view, partly in section, of a part of the mechanism for operating the magazine feed screws taken on the line XXIV—XXIV of Fig. 25. Fig. 25 is a fragmentary elevation, partly in section, of the mechanism shown in Fig. 24 for operating the feed screws and thereby feeding the shooks within the magazines. Fig. 26 is a fragmentary plan, partly in section, of a part of the pneumatic means for transferring the shooks. Fig. 27 is an end elevation of Fig. 26. Fig. 28 is a view, partly in section and partly in elevation, the section being taken on the line XXVIII—XXVIII of Fig. 26. Fig. 29 is a section taken on the line XXIX—XXIX of Fig. 26. Fig. 30 is a section taken on the line XXX—XXX of Fig. 26. Fig. 31 is a plan view, partly in section, showing a part of the means for elevating and lowering and also rotating the pneumatic shook transfer device, the section being taken on the line XXXI—XXXI of Fig. 32. Fig. 32 is a vertical section, partly in elevation, taken on the line XXXII—XXXII of Fig. 31. Fig. 33 is a fragmentary view of a part of the shook carrier which receives the shooks from the pneumatic transfer means and carries it in position to be operated on by the box-forming mechanism, and also to receive and carry the completed boxes in position to be discharged from the machine. Fig. 34 is a fragmentary transverse vertical section taken on the line XXXIV—XXXIV of Fig. 33. Fig. 35 is a section taken on the line XXXV—XXXV of Fig. 33. Fig. 36 is an enlarged detail view of one of the connections adapted to engage a cam and to be operated thereby to shift the position of the shook-holding means arranged within the shook carrier. Fig. 37 is a detail perspective view of one of the corner pieces adapted to receive and hold the completed box or basket after being formed to carry the same into position to be discharged from the machine. Fig. 38 is a detail view, partly in section and partly in elevation, of the means for controlling the valves which feed the shooks in order that the air may act properly to lift the shooks from the magazine and to discharge the same into the carrier, the section being taken on the line XXXVIII—XXXVIII of Fig. 39. Fig. 39 is a fragmentary view, partly in section and partly in elevation, of the mechanism shown in Fig. 38. Fig. 40 is a detail view, partly in section, of the means for intermittently rotating the carrier shaft, the view being taken on the line XL—XL of Fig. 41. Fig. 41 is a fragmentary view, partly in section and partly in elevation, of the mechanism shown in Fig. 40. Fig. 42 is a fragmentary plan view of a slightly different form of picker or transfer device; and Fig. 43 is a side elevation, partly in section of the parts shown in Fig. 58.

While I show the invention as applied to a particular form of machine, it will be understood that many of the features may be used in connection with other forms of machine and that some of the parts may be dispensed with or other features substituted therefor without departing from the spirit of the invention.

The machine to which this particular mechanism is applied and in connection with which the invention is shown, is for making boxes or baskets substantially rectangular in cross-section from two shooks laid crosswise and when formed in the shape of a box has a metallic binding strip placed about the upper open edge of the box for binding and holding the box body together. The shooks of which the box body is made are placed in two magazines located adjacent to one end of the machine, and these shooks are automatically fed upward in position to be removed therefrom. A reciprocatory and rotary pneumatic device is provided for this purpose and this device is automatically controlled so that the shooks will be picked up first from one magazine and then from the other, so that the shooks as thus picked up will lie crosswise and at substantially right angles to each other. The pneumatic device discharges the crossed shooks into a rotary carrier or turret. A movement is given to the carrier and this places the crossed shooks in the path of box-forming mechanism, and at the proper time this mechanism operates to form the shooks into box form and carries the box from above the carrier and forces the upper edge thereof into the binding strip. The binding strip is then pinched on to the shooks thus holding the box shooks permanently together in box form. Mechanism is provided for stripping the box and causing the completed box to be deposited into the carrier, and the carrier as it feeds new shooks crosswise to the die mechanism conveys the completed box into position to be discharged. The completed box is forced out of the carrier into a chute and properly stacked and may be removed in any desired way.

In Figs. 1, 2, 3, and in larger detail in Figs. 4 to 26, is shown one means whereby the shooks may be held in a plurality of magazines and automatically fed vertically upward in position to be removed therefrom by suitable mechanism which will be hereinafter described. As shown, there are two magazines 242 and 243 arranged at the rear and at one side of the machine frame. These magazines are similarly constructed and are arranged at an angle with respect to the longitudinal center of the machine and each magazine has a frame member 244 which is securely bolted to the machine frame. The frame member 244 has a follower 245 adapted to move vertically therein, and said follower 245 forms a support for the veneer or other shooks. The follower is provided with a slide portion 246 which is adapted to move vertically in the guides 247 which are secured within a recessed part of the magazine frame member 244 by means of screws 248. A detachable shook-holding member 249, Fig. 23, is detachably held to each magazine frame member 244 so that said holder may be readily attached to or detached from the magazine frame 244 to supply new shooks as they are exhausted by being fed to the machine. This holder 249 is substantially U-shaped in form so as to inclose the shooks and has its body portion 250 of sheet steel or other metal provided with angle irons 251 for strengthening purposes, and substantially U-shaped bars 252 at the upper and lower portion thereof also for strengthening purposes. At the inner ends of the shook-holding member 249 are angle irons 253 extending the entire length of the magazine, a part of which projects below the lower bars 252, and secured to the sides of the member 249 are plates 254 which serve to support the shooks temporarily within the holder until the same have been placed within the frame member 244 and over the follower 245. The frame member 244 is provided with supports 255 at opposite corners thereof which provide spaces 255$^a$, Fig. 5, into which is adapted to be seated the angular ends 256 of the magazine holder member 249. The upper portion of the holding member 249 is held against accidental displacement while in working position and in such a way as to be readily detached therefrom by means of pivotally held spring arms or levers 257. The levers 257 are pivoted at 258 in forked guides or brackets 259 and 259$^a$ located on opposite sides of the magazine frame member 244 and each lever 257 has a tooth 260 which engages the edge of one of the angle irons 253, a spring 260$^a$ being provided to keep the lever catches in engaging position. The magazine holder member 249 may be readily placed with its open side against the inner face of the frame member 244 and between the guides 259 and 259$^a$ and when held in the position shown the said holder will be detachably held as a part of the magazine and the shooks may be made to rest upon the follower 245.

The follower in its lowest position is below the point where the shooks are supported by the plates 254, and it then becomes necessary to raise the follower of each magazine until the follower engages the lowest shook. To do this quickly, a shaft 261, Figs. 20 and 21, is located convenient to the magazines and on this shaft is an operating handle or lever 261$^a$. The shaft 261 is suitably supported in brackets 262 and fixed to the shaft 261 is a sleeve or collar 263 which has clutch teeth 264 and 265 on opposite faces thereof. The clutch teeth 264 are adapted to engage the clutch teeth 266 on the boss 267 of a lever or arm 268, the outer end of which carries a roller or trundle 269 which is adapted to engage under a projecting part of one of the followers, as a part 270, to elevate said follower of one of the magazines while the teeth 265 engage teeth 271 of the boss 272 of a lever 273 extending in an opposite direction to that of the lever 268 and on which is a trundle or roll 274 adapted to engage the follower of the other magazine. These levers 268 and 273 are each pivoted on the shaft 261, and are each normally held in a lowered position by a spring 275, one end of which spring is securely held to a projecting part of each of said levers. It will be seen that when the lever 261$^a$ is moved in one direction, as that indicated in dotted lines in Fig. 21, the clutch teeth 264 of the collar 263 will engage the teeth on the boss 267 of lever 268 and will move the same therewith and thereby the follower within the magazine coöperating with the arm 268. During this movement of the lever, owing to the spacing of the teeth, the arm 273 is not operated, but by moving the lever in the opposite direction the teeth 265 of the collar 263 will engage the teeth 271 formed on one face of the arm 273 and through the roll 274 will elevate the follower in the other magazine. The shooks will thus be raised in either of the magazines from their initial support on the plates 254 of the frame holder 249 and will be supported on the follower, in order that all the shooks may be raised or fed upward by the follower in either of the magazines.

To feed the shooks upward in either of the magazines each of said magazines is provided with a screw 276 which is rotatably held in the magazine frame member 244. The screw 276 has an upper threaded portion 277 for a purpose to be hereinafter described, and a lower threaded portion 278. The lower threaded portion 278 is engaged by the threaded ends 279 of a device 280 forming substantially a split nut. The threaded end 279 is formed as part of two lever members 281 and 282, and each of these lever members are pivoted at 283 to a part of the follower, and said ends 279 are normally forced toward each other to cause the threaded portions to engage the threads 278 by means of a spring 284 the ends of which surround lugs 285 extending inward from each of the lever members 281 and 282, each lever member having a handle portion 286 by which the lever members may be moved on their pivots. It will be readily seen that in their normal position, when the threaded portion 279 engages the threaded part 278 of the screw 276, the follower will be raised within the magazine when the said screw is rotated, and by manually forcing the handle portions 286 toward each other the threaded portions 279 will be released from the screw so that the follower may be lowered, which it will readily do owing to its weight, and when the gripping parts 286 are released the spring 284 will force the threaded ends 279 again into engagement with the threaded part 278 of the screw, so that when the screw is rotated as will be presently described, it will again move each follower upward within its magazine.

The threaded part 277 of each screw 276, the screw of each magazine as well as the other parts thereof being substantially the same, is spaced from the part 278 to provide a part 287 on which there is no thread, so that when the follower reaches the point where the threaded ends 279 of the follower feed nut passes beyond the thread 278 into the space 287 the said follower will cease to move upward even if the screw is rotated. At this time the top surface of the follower is above the plane of movement of two pivotally held arms 288 and 289. These arms are pivoted on the rods 289$^a$ and these arms are supported upon an independently movable frame 290 forming a part of a supplemental feed 291, the purpose of this feed being to continue to feed the shooks within the magazine independent of the follower 245 and until a new magazine holder full of shooks has been again placed in position to recharge the magazine. The supplemental feed frame 290 is located at the rear of the magazine frame and at the upper portion thereof, and said frame has a part 291$^a$ which is held to move vertically in the guides 292 located on opposite sides of the feed screw 276. A lever 293 is pivoted at 294 adjacent to the feed screw 276 and on the feed frame 290 and this lever 293 has a threaded part 294$^a$ at one end and a segmental gear 295 at the other end. The teeth 295 are in mesh with similar teeth on an arm 296, Figs. 8 and 9, of the pivotal arm 289 so that when the arm is moved in one direction it will throw the threaded portion 294$^a$ out of engagement with the screw and on movement in the opposite direction will cause the threaded portion 294$^a$ to engage the screw and thereby move the frame together with the pivotal arms 288 and 289 upward to feed the shooks. When the follower 245 is in operation the arms 288 and 289 should be out of the path of the follower and the shooks and in the position shown in dotted lines in Fig. 8. This is secured by forming on the main frame member of the magazine a recessed or cut-away part 297 on each side of the magazine against the solid portion of which the inner edge 299 of each of the pivoted arms 288 and 289 are adapted to rest and which holds the said arms in position shown in dotted lines. When the follower 245 is about to become disengaged from the threads 278 of the feed screw, the frame 290 is elevated a sufficient distance by the engagement of the part 299$^a$ with a part of the supplemental feed frame to release the edges 299 of the pivoted arms 288 and 289 from the solid portion of the magazine frame member, at which time the said arms will move inward through openings 300 formed in the sides of the magazine frame member which openings extend to the top of the magazine so that the frame member and arms may move upward to carry the shooks supported thereby. The follower is cut-away at 301 to permit the arms 288 and 289 to pass under the shooks and engage the latter and to permit the follower to be lowered to the lower part of the magazine in position to again feed the shooks upward when the new magazine holder is placed in position, the said arms 288 and 289 being normally forced inward by means of springs 302 arranged around the rods 289$^a$. By this means the shooks are fed upward part of the distance by the follower 245 of each magazine and when at a certain point and before the entire supply is exhausted the supplemental feed is thrown into operation which continues to move the remaining shooks upward through the magazine until it can be again charged with a new supply held in the magazine holding member, the said supplemental feed being lowered into position again by moving the arms 288 and 289 outward until the arms again engage the solid portion or grooves 297 of the magazine frame member, as shown best in Fig. 10.

The upper portion of each magazine is provided with a plurality of fingers 303. These fingers are located at the upper portion of the frame member near the corners thereof and are adapted to engage the shooks so as to hold the same substantially independent. These fingers are pivoted at 304 to rods 305 and to two of these rods are held links 308, the links at one side of each magazine being connected by a rod 307 so that said fingers 303 will move together either inward or outward according to the width of the shook and will center the shook in its proper place. The shooks will be forced rearward by the two front fingers and the two outer side fingers are connected together to center the shooks by engagement with their ends. Each finger at its upper edge is provided with a series of serrations 308 tending to keep the shooks separated, and at its lower end has a recessed portion 309 adapted to receive a spring 310 which normally forces the teeth 308 inward, and the purpose of the fingers is to prevent more than one shook being fed at one time.

To rotate the feed screw 276 of each magazine and to automatically control the feed through the upper shooks of each magazine various means may be employed. As shown, each feed screw has a disk 311 which is provided with a flange 312, and said disk is rigidly fastened to the screw and is held against upward movement by an angular plate 312ª. A lever 313 is pivotally held to the lower part of the feed screw 276 to rock independently of said feed screw, and this lever is forced in one direction by a spring 313ª, Fig. 7, and is limited in this movement by a bolt 313ᵇ. The lever adjacent to the screw has recesses 314 in which are loosely seated the ends 315 of friction dogs 316. These dogs 316 have slots 317 whereby the dogs may be made to span the flange 312, and connected to the dogs are the springs 318 one end of each spring being held to a post or pin 319. It will be seen that when the arm 313 is rocked in one direction the dogs will move free of the flange 312 but when said arm is moved in the opposite direction the dogs will grip the flange of the disk 311 and will impart a like movement to the feed screw.

A reciprocatory bar 320 is located adjacent to the magazines and held to this bar are pawls or dogs 321 and 321ª. Each dog is pivoted at 322 to the bar and has its other end in the form of a tooth 323 which is adapted when the bar 320 is reciprocated and the said dog depressed to engage a roll 324 carried by the outer end of each of the feed screw operating levers or arms 313. The dogs 321 are normally forced upward by a spring 325 arranged around a bolt 326 and the tension of said spring may be varied by nuts 327 or otherwise. The bar 320 is normally forced in one direction by a spring 328, Figs. 24 and 25, and carried by said bar is a projection carrying a pin fitting into a bearing or box 329 which is adapted to fit in the slotted end of a lever 330. This lever 330 is pivoted to a shaft 331 and on the outer end of said lever is a trundle or roll 332 which is adapted to be engaged by a cam 333 located on the main vertical drive shaft 334, the said shaft 334 being provided at its lower end with a miter gear which is in mesh with a similar gear secured to the shaft 45.

As the thickness of the shooks may vary and to prevent crowding of the shooks at the upper part of the magazine against the shook-removing mechanism and in order that the shooks may be removed one at a time, I provide automatic means controlled by the height of the shooks which will regulate the operation of the feed screws to permit the same to operate according as to whether or not the shooks are fed properly. To secure this, a plate 337 is arranged at the upper part of each magazine against which the upper shook may press and this plate is connected to a slidable rod 338 which is bent intermediate its ends where it is pivoted to a link or crank 339. This crank is pivoted at 340 to forked brackets extending outward from the magazine frame member 244 so that when the rod 338 is up the said crank will move the plate 337 upward and outward. The rod 338 is also connected to a crank 341, one for each magazine, and said cranks are connected one to a shaft 342 and the other to a shaft 343. The shaft 343 is located between the feed screw arms 313 and the shaft 342 at one side of one of said arms, and carried by the shaft 342 is an arm 344 while on the shaft 343 is an arm 345 in the outer end of each of which is a roll 346.

The shaft 343 is provided with an arm 347 to which is pivotally held a rod 348 on which is fixed a collar 349. The free end of the rod 348 is provided with a collar 350 and slidable upon the rod is a sleeve 351. A spring 352 is interposed between the collar 350 and one end of the sleeve 351 and said spring tends normally to force the rod 348 lengthwise of the sleeve and the collar 350 away from said sleeve. An arm 353 is held to the shaft 342 at one end thereof and pivotally connected to said arm is a rod 354. This rod 354 has a collar 355 secured thereto and said rod is connected to the crank arm 353 by a ball and socket joint, as at 356. A collar 357 is secured to the outer end of the rod 354 and slidable on the rod between the collars 355 and 357 is a sleeve 358, a spring 358ª being arranged around the rod 354 between the collar 355 and the sleeve 358. The sleeves 351 and 358 are pivotally held to a rocking arm 359 in any desired way and this arm is held to a shaft 360. An arm 361 projects from the shaft 360 and connected to the outer end of this arm is a rod 362, the upper end of which is connected to a lever 363 which is operated in a manner to be hereinafter described.

It will be seen when the bar or rod 320 is reciprocated through the lever 330 and cam 333 that the dogs 321 and 321ª mounted on said bar will also be reciprocated. The rod 362 through the lever 363 will be given an up-and-down movement and this will rock the shaft 360 and arm 359. This rocking movement of the arm 359 will reciprocate the sleeves 351 and 358 and through the springs 352 and 358ª will yieldingly force the rods on which the sleeves slide to rock the shafts 343 and 342 which will force the arms 345 and 344, respectively, downward, causing the pawls coöperating with said arms to engage the rolls of the feed screw arms 313 and thereby force the followers upward in the magazines. At the same time that this is taking place through the engagement of the rolls 346 with the dogs, the shafts 342 and 343 will operate the cranks 341 which will force the rods 338 downward at each reciprocation of the rods 348 and 354. As each rod 338 is connected to a shook-engaging plate 337 the latter will be moved downward and inward with the downward movement of each rod 338 to engage the uppermost shook. If the feed has been too rapid and the shooks begin to crowd at the upper end of either of the magazines, the plate 337 cannot descend as far as it otherwise would and this will hold one of the shafts 342 and 343 against further movement according to which magazine contains the crowded shooks. If the shaft 343, for example, is held against further movement by reason of the crowding of the shooks the sleeve 351 can reciprocate on the rod 348 by reason of the spring 352 without operating the arm 347. This will cause the cooperating roll 346 carried by the arm 345 to remain out of the path of the dog 321 so that the reciprocation of the bar 320 may continue without operating its cooperating feed screw arm 313 thus stopping the feed of the particular magazine in which the shooks have been fed too rapidly. As soon as the position of the uppermost shook is proper and the feed normal the plate 337 of that magazine will be permitted to lower far enough during the reciprocation of the rod 338 cooperating therewith to cause the roll 346 of the arm 345 to force the dog 321 into engagement with its feed screw arm to again start the feed. It will be understood, of course, that the crowding in the other magazine will be similarly prevented through the rod 354 and that the feed may be automatically stopped in either or both magazines in the manner described.

As the shooks are fed upward in the magazines they are automatically removed therefrom one at a time and these shooks are placed crosswise with respect to each other in a rotary carrier or turret, and by the carrier the shooks in crosswise position will be moved in the path of die mechanism which bends the shooks into box form ready to have the binding strip, previously formed and held to the anvil, as already described, applied thereto. As one means for removing the shooks, I provide a rotary and reciprocatory device 365, Figs. 2, 26 to 32, having means to raise the shooks one at a time and in succession from the magazines. The head 365ª has three tubular arms 366 bolted thereto and radially arranged and these arms are similarly constructed so that a description of one will answer for the others. Each tubular arm is provided with a flange 367 which is bolted by screws 368 or otherwise to the head 365ª at equal distances apart and on the outer end of said arm is a pneumatic head 369. This head is constructed to remove one of the shooks from one of the magazines and when rotated and placed over the next magazine it will also lift a shook from the second magazine so that one shook will lie crosswise of the other owing to the rotary movement of the device 365 and also the position of the shook magazines with respect to said heads. The head 369 carries a plurality of pneumatic cup-like devices 370 and 371. Each of these devices is made of flexible material, as rubber, to provide a suction device, and each has a holding nipple 372 of tubular form which communicates with the tubular arm so that suction may be created, and when the suction cups or devices are forced against the shooks, as will be presently described, the said shooks will be held thereto until the suction is again released. The devices 370 are intended for the shooks of one of the magazines, and the devices 371 for the shooks of the other magazine, and the suction in each set of devices is independently controlled so that the action of one will not affect that of the other, the engaging surface of the devices 371 being somewhat lower than the engaging surface of the devices 370 according to the thickness of the shooks so that the devices 370 may first engage the shooks of one magazine and the devices 371 properly engage the shooks of the next magazine without at all interfering with each other and so that the shooks will lie close against each other while so held by each head.

The heads act upon the shooks in the magazine in a similar manner but in succession and each of the arms 366 has two chambers 373 and 374. The chamber 374 is controlled by a valve 375 which is held to a rod or stem 376. This valve 375 has a seat in a bushing 377 held to the tubular arm, and resting against the bushing is a spring 378, one end of which rests against a collar 379 adjustably held by screw threads or otherwise to the valve stem or rod 376 and tends normally to force the valve 375 to its seat 377. The outer end of the valve stem 376 is held to a slide in a sleeve 380 the outer end of which latter is guided in a recess 381 in a cap 382 secured by threads to the outer end of the tubular arm 366. The sleeve 380 is provided with a collar 380ª between which and a nut 380ᵇ is a valve 383 which is adapted to engage a seat in the bushing 384, said valve serving to control the suction in the chamber 373. The valve 383 is normally held to its seat by a spring 385 one end of which rests against the collar 380ª and its other end is seated in a recess in the cap 382. As will be seen when the rod or stem 376 is forced outward the valve 375 will be moved away from its seat and forms a communication through a passage to a chamber 386 within the head 365ª. The chamber 386 communicates with an exhaust pump or other means for creating suction in a manner to be presently described, and when suction is created in the chamber 374 the said chamber owing to its communication with the suction cups 370 through the common chamber 387 will cause one of the shooks in one of the magazines to be held by the devices 370 and when the head is moved into position over the next magazine, the valve stem 376 will be moved a further distance and this will cause the outer face of the collar 375 to engage the inner part of the sleeve 380 which will open the valve 383 causing a communication between the tubular head through the passageway 388 and the chamber 373 and from there direct to the chamber 386 of the head 365ª.

The head 365ª with its arms should be not only lowered to engage the shooks in the magazines but must be raised to lift the shooks therefrom and also must have a rotary movement imparted thereto, timed with respect to the movement of the shook feed mechanism of the machine. At the proper time the valves of each arm are automatically operated to cause the shooks to be held thereto, and after a shook has been removed from each magazine by one of the heads the said shooks in a crosswise position must have the suction so controlled as to simultaneously discharge the shooks from the heads 369. To accomplish this reciprocatory movement of the pneumatic device as well as its rotary movement and also to intermittently rotate the device, I secure the head 365ª to a tubular shaft 389. This shaft 389 is vertically arranged and is secured to the head 365ª by a tubular cap 390, Fig. 28, the said head being provided with a removable plug 391 for access to the said cap and the interior of the head. The shaft 389 is held to rotate and also to reciprocate in the boss 392 forming a part of the machine frame, and at the lower end of the shaft is a nipple or coupling member 393 of any suitable construction to which may be attached a flexible hose or pipe 394 leading to a suitable exhaust apparatus. The coupling 393 is held to a rock arm 395 and this rock arm is held to a shaft 396 and formed integral with an arm 395 is a second arm 397. This arm 397 is connected by a rod 398 to the outer end of a lever 399. The lever 399 is pivoted at 400, Figs. 31 and 32, and one end of said lever 399 carries a trundle 401 which is engaged by a cam 402 secured to the main vertical drive shaft 334, so that when said shaft 334 is rotated, it will rock the lever 399 and through the rod 398 and arms 397 and 395 will cause a vertical movement to be imparted to the tubular shaft 389, the said shaft and parts being restored to their normal position either through the weight of the pneumatic device or by a separate spring or springs, if desired, which may be provided for that purpose. The tubular shaft is thus moved upward and downward to carry the pneumatic device, and to cause the pneumatic heads 369 to pass into the magazines and also to remove the shooks one at a time therefrom.

When one of the shooks has been removed, that is by the suction cups 370, the entire device is given an intermittent rotary movement to carry the pneumatic head over the next magazine and said head is again lowered into that magazine to cause the suction cups 371 to engage the uppermost shook in said second magazine to remove the same therefrom. This rotary movement of the tubular shaft 389 with its pneumatic device is effected through a gear 403 which is secured to the shaft 389 and this gear is in mesh with a larger gear 404 rotatably held on a shaft or stud 405. The gear 404 has its face wide enough to permit a vertical movement of the gear 403 with the shaft 389 and still be rotated thereby, and meshing with the gear 404 is a gear 405ª which is held to a carrier or turret shaft 406. This shaft 406 Figs. 40 and 41, is given an intermittent movement by a modified Geneva movement 407. This movement comprises two members 408 and 409, the latter being secured to the shaft 406 and the former to the shaft 334. This movement differs from the ordinary form of Geneva movement in that the trundle 410 which alternately engages the slots 411 is movable radially by a block or slide 412, one end of which carries a trundle 413 movable in a cam groove 414 in a stationary member 414ᵇ. The member 408 has a radial peripheral surface to engage the surface 414ª for locking purposes and the reason for moving the trundle 410 inward and outward is that a more uniform rotary movement is thereby secured to the shaft 406, as the said trundle 410 is moved near or further from the center during the rotary movement of the member 408, and while this form of movement is preferred any other movement may be employed.

It will be seen that the arm 363 for operating the rod 362 of the shook feed mechanism is integral with the arm 397 of the pneumatic transfer means and therefore simultaneously operated by the same cam and timed with relation to each other.

Each valve stem 376 of the pneumatic shook transfer device must be operated at the proper time and with relation to the movement of said device, and to accomplish this the inner end of each valve stem is normally held in contact with an arm 415. Each arm 415 is secured to a vertically arranged shaft 416, Figs. 26, 28, 38 and 39, and on the lower end of each shaft 416 is an arm 417 one end of which carries a trundle 418. The trundles 418 are adapted to be engaged by a shiftable cam 419, Figs. 38 and 39, which is held to rotate independently on the tubular pneumatic transfer device shaft 389. This cam is so shaped that it will operate the arms to open the valves 375 and 383 at the proper time and to shift said cam at the proper time is an arm 420 to which is connected one end of a rod 421. This rod 421 is connected to an arm 422, and this arm is connected to oscillate with an arm 423, one end of which latter arm is provided with a trundle 424 which engages a cam slot 425 of a cam 426 held to the main vertical drive shaft 334. As the shaft 334 rotates it will rotate the cam 426 and through it move the rod 421 and shift the position of the cam 419 relatively with respect to the position of the pneumatic transfer head and through the arms 417, shafts 416 and arms 415 within the tubular head force the proper stem or stems 376 outward at the proper time to open the valves or permit the said valves to close according to whether or not the shooks are being transferred by said device or discharged therefrom.

The shooks as they are transferred by the pneumatic transfer device in crosswise relation, that is one taken from one of the magazines and held by the devices 370 and the other at right angles thereto and taken from the second magazine by the suction devices 371, are moved one-third of a rotation over a transfer carrier 427 into which the shooks are discharged. This carrier is in the form of a turret and has four shook receivers 428, 429, 430 and 431. These receivers are radially arranged upon a turret or wheel member 432 which is secured to the upper end of the vertical shaft 406, the latter being rotated from the main vertical shaft 334 as already described and as shown best in Figs. 40 and 41. A carrier frame or member 432 has four receiver frames 433 bolted thereto. Each of these frames has a circular flange portion 434 and projecting inward therefrom are lugs to which are pivotally held supporting elements or members 435, 436, 437 and 438. These elements have angularly formed portions forming a seat for the outer ends of the shooks and the elements 437 and 435 are opposed to each other and support one shook, as 439, while the shook 440, Fig. 33, is supported between the elements 438 and 436. A shaft 441 is journaled in the frame under the shook supporting element 437 to which the latter is held by lugs or otherwise so as to have an oscillatory movement with said shaft, and under the shook supporting element 435 is a similar shaft 442 which is journaled in the receiver frame and has the element 435 held to oscillate therewith as by lugs projecting beneath the supporting portion of said element. One end of the shaft 441 is provided with a crank arm 443 extending downward therefrom, and the shaft 442 has a crank arm 444 extending upward, the crank arms being connected by a rod 445. The rod 445 is provided with a collar 446 and normally forcing the collar and rod in one direction is a spring 447 which has one end bearing against a projection on the carrier and tends normally to force the arm 443 in one direction to shift the position of the elements 435 and 437. The elements 436 and 438 are located at right angles to the shook supporting elements 435 and 437 and the element 436 has an extension 448 while the element 438 has an extension 449. These extensions 448 and 449 together with the elements are suitably supported to swing in bearings on a part of the receiver frame of the carrier, and to the part 448 is held an arm 450 in line with its pivot and projecting upward, while from the extension 449 is an arm 451 extending downward therefrom. The arms 450 and 451 are connected by a rod 452 and this rod is provided with a collar 453. A spring 454 is arranged around the rod 452 between the collar 453 and a projection 455, Fig. 33, and serves normally to force the elements 436 and 438 to a closed position to receive the shooks as they are discharged from one of the arms of the pneumatic transfer device 365.

As soon as the supporting elements 435 to 438 receive the shooks, the said elements are moved on their pivots to aline the shooks and to hold them properly prior to the same being formed into box shape and to operate said elements the arm 444 to which the rod 445 is pivoted is extended and carries a trundle 456, Fig. 36, which is adapted to be operated by a cam or cams 457 held to move on the shaft 406 independently thereof. The cams 457 are movable with an arm 458, and said cams are secured to the boss of said arm and are adapted to operate the shafts of the carrier alining elements of each of the shook receivers. The outer end of the arm 458 is connected by a rod 459, which may be adjustable by a turn-buckle 460 to an arm 461 which is operated through the arm 423 and the cam 426 to be shifted relatively to the position of the carrier and its receivers 428 to 431, in order that the said shook supporting elements may be operated with a movement inward to properly aline the shooks and while the carrier is stationary.

In receiving the shooks from the picker or pneumatic transfer device, the rock cam 457 opens the shook holding chairs or elements 435 to 438 and this action compresses the springs 447 and 454. When the picker or pneumatic transfer device descends the rock cam makes a movement to the right a part of a revolution, thus allowing and depending upon the springs 447 and 454 to close the chairs or elements on the shooks and properly center them; while diametrically opposite to the foregoing part of the cam 457 the said cam is forcibly opening the elements or chairs 435 and 438 against the action of springs 447 and 454 but not until after the two shook folding members have hold of the shooks as will be hereinafter described. The shooks while held by the carrier are moved therewith so as to be interposed between the plunger element and the die element of suitable box-forming mechanism. As these parts are not claimed herein and form no part of the present application, a detail description is not thought necessary.

It will be understood that the word "veneer" where it is used, is employed in its broadest sense and is intended to include any kind of material that may be utilized for making the box body whether such material is paper, sheet pulp or of any other character.

The invention thus far described is exactly the same as in my application Sr. No. 645,323 hereinbefore referred to, but it will be understood that some of the parts may be changed if desired. In Figs. 42 and 43, the suction cups 506 instead of presenting an entirely flat lower surface are mounted so that the lower surface will conform to a curved shook. This arrangement of the cups 506 will pick up a flat shook in such a way that it pulls up the center part of the shook before it does the edges, thereby allowing air to enter between that shook and the one below and making the devices less liable to pick up two shooks. The oval-shaped cups which pick up the second shook and the round cups which pick up the first shooks of each pair are both arranged to present curved surfaces.

If the machine is run rapidly it was found that there was often sufficient suction to withdraw the shooks again even after the valves were shut off and the shooks were deposited in the carrier or turret. To overcome this and to release the slight vacuum a series of holes 507 are provided. These holes are normally closed by a spring plate 508 or other device, and said plate has its outer end adapted to ride over a fixed bracket 509 located in the path of movement of said plate. Each arm of the transfer device has a plate and each plate, which acts as a valve, has one of its ends secured to one of the arms by screws 510 or otherwise. When the pneumatic transfer device is rotated to deposit a pair of shooks into the carrier, the outer free end of the plate 508 will swing over the bracket. As the device lowers into the carrier the spring plate is raised enough to permit the air within the valve chambers to escape and thereby relieve the device of any vacuum that might again withdraw the shooks from the carrier.

From the foregoing, it will be seen that simple and efficient mechanism is provided whereby the shooks may be held in a large quantity and fed automatically to suitable box-forming means; that simple mechanism is provided for automatically controlling the feed of the shooks and for placing them crosswise; and that effective means is provided for placing the shooks in position to have the box body made.

Having thus described my invention, I claim as new and desire to secure by Letters Patent:—

1. In a box-making machine, the combination of two independent magazines for holding body material, means for removing the body material from the magazines in succession and holding them crosswise, together with means for elevating the material simultaneously or independently in the magazines and for automatically controlling the elevating means.

2. In a box-making machine, the combination of means for holding box material in two stacks, two independent mechanisms for each stack elevating at different times the same stack, means for picking up the box material in succession from the holding means and transferring the same crosswise, and means for automatically controlling the elevating means.

3. In a box-making machine, the combination of two independent magazines for holding veneer shooks, means for removing the shooks or veneer from the magazines in succession and holding them crosswise, a carrier for transferring the shooks, together with means for elevating the veneer independently or simultaneously in the magazines.

4. The combination of a magazine having a holding element as a part thereof, a follower movable in said magazine and adapted to hold a stack of veneer, means for detachably holding the holding element in position, means for actuating the follower, together with supplemental means for feeding the veneer of the same stack in the magazine after the follower has ceased to feed, said supplemental means being independent of the follower.

5. The combination of a magazine for holding box material in a stack, a follower movable in said magazine to support the stack, means for actuating the follower, together with supplemental means entirely independent of the follower for feeding the box material in the magazine from the same stack.

6. The combination of a plurality of magazines each having a holding element as a part thereof, a follower movable in each magazine adapted to hold a stack of box material, means for detachably holding each holding element in position, means for simultaneously actuating the followers, supplemental means for feeding the box material in the magazines from the same stack independent of the follower, and means for removing the shooks from the magazines in succession and holding them crosswise in pairs.

7. The combination of two magazines adapted to hold box material and a main and supplemental feed for each magazine, means for simultaneously operating both main feeds, means for automatically throwing in the supplemental feed by the main feed, and means for removing the shooks from the magazines and holding them crosswise in pairs.

8. The combination of a magazine adapted to hold box material, a main and a supplemental feed for the magazine, and means for automatically throwing in the supplemental feed by the main feed.

9. The combination of two magazines adapted to hold box material in a stack, means for removing the box material in succession from the magazines and holding them crosswise, a main and a supplemental feed for each magazine acting on the same stack of material, and means for operating both main feeds or the supplemental feeds simultaneously or independently.

10. The combination of two magazines located adjacent to each other and adapted to hold box material, means for removing the material from the magazines in succession and holding them crosswise of each other, a main and a supplemental feed for each magazine, a follower forming a part of the main feed for forcing the box material upward in each magazine, and means for automatically throwing in the supplemental feed when the follower has traveled a predetermined distance.

11. The combination of a plurality of magazines located adjacent to each other adapted to hold box material, means for removing the material from the magazines in succession, and transferring said material therefrom, a main and a supplemental feed for each magazine acting in succession on the same lot of material, and a follower forming a part of the main feed but independent of the supplemental feed for forcing the material upward in each magazine.

12. The combination of two magazines located adjacent to each other adapted to hold box shooks, means for removing the shooks from the magazines in succession in crosswise position of each other, and a main and a supplemental feed for each magazine acting on the same lot of shooks, the said supplemental feed being thrown into action by the main feed.

13. The combination of a plurality of magazines adapted to hold box material, each having a frame member and a detachable holding member, a main and a supplemental feed for each magazine acting in succession on the same lot of material, means for operating the main feeding means simultaneously, and means for removing the shooks from the magazines in succession and holding them crosswise in pairs, said supplemental feed being thrown into action by the main feed.

14. The combination of a plurality of magazines, each having a frame member and a detachable holding member, a main and a supplemental feed for each magazine, means for operating the main feeds simultaneously, means for controlling the supplemental feed by the main feed, means for transferring the box material from the magazines in succession and holding the shooks crosswise in pairs.

15. The combination of a plurality of magazines adapted to support veneer shooks, a main and a supplemental feed for each magazine, means for simultaneously operating the main feeds, devices pivotally held to each magazine and adapted to engage the edges of the shooks and guide the same, separate means for actuating the supplemental feed of each magazine through the main feed thereof, means for automatically stopping the feed in case the shooks should be fed too rapidly, and means for removing the shooks in succession and holding them crosswise in pairs.

16. The combination of a plurality of magazines adapted to support box shooks, means for simultaneously feeding the shooks in the magazines, devices pivotally held to each magazine and adapted to engage the edges of the shooks and hold them substantially separated while stacked, means for moving the devices, and means for transferring the shooks from the magazines in succession and holding them crosswise in pairs.

17. The combination of a plurality of magazines adapted to hold body material, means for transferring the body material from the magazines in a crosswise position, a main feed and a supplemental feed for each magazine acting on the same lot of body material, and mechanism for timing and controlling the feed in each magazine independently by the means for actuating the transfer means, said supplemental feed being thrown into action by the main feed.

18. The combination of a plurality of magazines, means for removing and transferring the body material from the magazines in a crosswise position, feeding means for each magazine, and mechanism for controlling the feed in either or both magazines by the means for actuating the transfer means.

19. The combination of a plurality of magazines for holding blanks, each magazine having a vertically extending frame member, a substantially U-shaped vertically arranged detachable holding member, pivoted arms for detachably holding the holding member to the frame member, feeding means for simultaneously feeding the blanks upwardly in each magazine, and means for removing the shooks from the magazines in succession and holding them crosswise in pairs.

20. In a box-making machine, the combination of box material transfer means, two magazines located adjacent to each other and having a main frame member and a substantially rectangular holding member, said holding member comprising a substantially U-shaped sheet metal body having angular engaging strips, pivoted hook-shaped devices adapted to engage the angular strips to hold the box material holding member detachably to the frame member, means for simultaneously feeding the box material in both magazines, and means for removing the shooks from the magazines in succession and holding them crosswise in pairs.

21. In a box-making machine, the combination of transfer means for box blanks, a magazine having a main frame member and a substantially rectangular holding member, said holding member comprising a substantially U-shaped sheet metal body having angular engaging strips and pivoted devices adapted to engage the angular strips to hold the holding member detachably to the frame member.

22. In a box-making machine, the combination of transfer means for box blanks, two magazines located adjacent to each other and each having a main frame member and a substantially rectangular holding member, means for simultaneously feeding box blanks in both magazines, said holding member comprising a body having angular engaging parts, means adapted to engage said parts to hold the holding member detachably to the frame member, and means for removing a shook from each magazine in succession and holding them crosswise in pairs.

23. The combination of transfer means, a plurality of magazines, each having a vertically arranged screw with two separate feed portions, a follower adapted to engage one portion, means for simultaneously and automatically rotating the screws of both magazines with a step-by-step movement, means whereby the follower may be manually released to permit the same to be lowered, devices forming a supplemental feed and movable by the upper part of the screw, means for automatically throwing the devices into operative position to provide a supplemental feed and controlled by the movement of the follower, and means for removing the shooks from the magazines in succession and holding them crosswise in pairs.

24. In a box-making machine, a plurality of magazines, each having a vertically arranged screw with two separate feed portions, a follower adapted to engage one portion, means for simultaneously and automatically rotating the screws of both magazines with a step-by-step movement, means whereby the follower may be manually released to permit the same to be lowered, devices forming a supplemental feed and movable by the upper part of the screw, means for automatically throwing the devices into operative position to provide a supplemental feed and controlled by the movement of the follower, and means for removing the shooks from the magazines in succession and holding them crosswise in pairs.

25. In a box-making machine, a magazine having a vertically arranged screw with two separate feed portions, a follower adapted to engage one portion, means for automatically rotating the screw with a step-by-step movement, means whereby the follower may be manually released to permit the same to be lowered, devices forming a supplemental feed and movable by the upper part of the screw and means for automatically throwing the devices into operative position to provide a supplemental feed for the box material and controlled by the movement of the follower.

26. The combination of transfer means for box blanks, a magazine adapted to hold a stack of said blanks, a main feed, a supplemental feed acting on the same stack of blanks as the main feed, and means whereby either the main or the supplemental feed may be operated and the supplemental feed thrown into action by the main feed.

27. The combination of body material transfer means, a magazine, a main feed having a follower, a supplemental feed having two devices located at the upper part of the magazine and adapted to act on the same lot of body material, a common feed element for actuating both the follower and said devices, means for operating said feed element, means whereby only one feed of the magazine may be operated at a time, and means for preventing a too rapid feed.

28. The combination of two magazines, a main feed for each magazine having a follower, means for simultaneously moving both followers, a supplemental feed having two pivotally held and laterally movable devices located at the upper part of each magazine adapted to act on the same lot of material, a screw for actuating both the follower and said devices, means for operating said screw, means whereby only one feed may be operated at a time, means for removing the shooks in succession from the magazines and holding them crosswise in pairs, and means whereby the supplemental feed may be thrown into action by the main feed.

29. In a box-making machine, the combination of a plurality of magazines located adjacent to each other, transfer means for box blanks, together with a feed for each magazine comprising a vertically arranged screw having two threaded portions, means for intermittently rotating both of said screws, a follower engaging one of the threaded portions, supplemental feeding means, means for automatically throwing the supplemental feeding means into operation by the movement of the follower, and means for removing a single shook at a time from each magazine in succession and holding them crosswise in pairs.

30. In a box-making machine, a magazine for box blanks, a vertically arranged screw having two threaded portions, means for rotating said screw, a follower engaging one of the threaded portions, supplemental feeding means, and means for automatically throwing the supplemental feeding means into operation by the movement of the follower.

31. In a box-making machine, two magazines for holding box blanks in stacks, a main feed for each magazine comprising a vertically arranged screw having two threaded portions, and independent means thrown into action by the main feed and operated by the screw to feed the blanks.

32. In a box-making machine, the combination of a magazine adapted to hold shooks, initial feed means for the shooks and a supplemental feed comprising a feed frame, a screw, a pivotally held lever having a threaded portion adapted to engage said screw, two pivotally held arms adapted to engage under the shooks and held to move with the frame, means on the magazine for holding said pivotally held arms out of the path of the shooks, means connected to one of the arms for moving the lever out of engagement with the screw, springs tending normally to force the shook-supporting arms in position to engage under the shooks, and means whereby the initial feed may be caused to move the frame and release the arms from engagement with the magazine.

33. In a box-making machine, a magazine adapted to hold a stack of shooks, initial feed means for the shooks, and a supplemental feed adapted to act on the same stack of shooks comprising a feed frame, means movable with the feed frame adapted to engage under the shooks, means for moving the frame, and means for automatically placing in action the means engaging under the shooks.

34. The combination of a magazine adapted to hold shooks, initial feed means for the shooks, and a supplemental feed comprising arms and a feed frame, a screw, a pivotally held lever having a threaded portion adapted to engage said screw, arms normally resting against a part of the magazines and adapted to engage under the shooks and held to move with the frame, means for moving the lever out of engagement with the screw, and means whereby the initial feed may be caused to move the frame and release the arms from engagement with the magazine.

35. In a box-making machine, the combination of a magazine adapted to hold shooks, initial feed means for the shooks and a supplemental feed comprising a feed frame, a screw, a pivotally held lever having a threaded portion adapted to engage said screw, two pivotally held arms adapted to engage under the shooks and held to move with the frame, means on the magazine for holding said pivotally held arms out of the path of the shooks, and means for moving the lever out of engagement with the screw.

36. The combination of transfer means, a plurality of magazines having a main and a supplemental feed for the shooks, means for simultaneously operating the main feed of both magazines, together with spring pressed fingers located at the upper part of each magazine, means for pivotally holding said fingers, links connected to two of the fingers on opposite sides of the magazine, a rod connecting the links to move the fingers in unison to center the shooks, said fingers being each provided with a serrated upper edge to substantially separate the shooks, and means for removing the shooks from the magazines in succession and holding them crosswise in pairs.

37. The combination of a plurality of magazines having a main and a supplemental feed for the shooks, means for simultaneously operating the main or the supplemental feeds, spring pressed fingers located at the upper part of each magazine and at the corners thereof, means for pivotally holding said fingers, links connected to two of the fingers on opposite sides of the magazine and a rod connecting the links to move the fingers in unison to center the shooks, and means for removing the shooks from the magazines in succession and holding them crosswise in pairs.

38. The combination of a plurality of magazines for holding the shooks, means for picking up body material from the magazines and holding them in a crosswise position, means for feeding the body material upwardly in the magazines, together with automatically actuated mechanism whereby the feed may be stopped in either or both magazines in case of crowding of the body material.

39. In a box-making machine, the combination of shook picking up and transfer means carrying the shooks crosswise, a plurality of magazines located adjacent to each other, a device adapted to engage the uppermost shook in each magazine, feeding means for the shooks of each magazine, and means controlled by the position of the device engaging the uppermost shook to stop the feed in either or both of the magazines.

40. In a box-making machine, the combination of shook transfer-means carrying the shooks crosswise and in pairs, a plurality of magazines located adjacent to each other, automatically actuated main and supplemental means for simultaneously feeding the shooks in the magazines, a device adapted to engage the uppermost shook in each magazine, a rod having an upward and outward movement connected to said device, a crank for constraining the movement of said rod, a second crank, together with mechanism for operating the feed of each magazine and controlled by the position of said device whereby the feed of the shooks may be automatically controlled.

41. The combination of transfer means for removing box blanks and holding them crosswise and in pairs, magazines located adjacent to each other, means for simultaneously feeding the blanks in the magazines, a device adapted to engage the uppermost shook in each magazine, a rod having a reciprocatory upward and outward movement connected to said device, together with mechanism for operating the feed of the magazine and controlled by the position of said device whereby the feed of the blanks may be automatically controlled.

42. In a box-making machine, the combination of a plurality of means for holding the shooks, feeding means for the shooks, means for simultaneously operating the feeding means, a device adapted to engage the uppermost shook of each holding means, a reciprocating bar, dogs carried by said bar adapted to engage the feed means for the shooks, rock arms adapted to engage the dogs and independently connected to the devices which engage the uppermost shook, a crank adapted to yieldingly operate the rocking arms according to the position of said devices, means for moving said crank to control the feed of the shooks, and means for removing the shooks in succession and holding them crosswise and in pairs.

43. The combination of a plurality of magazines for holding shooks, feeding means for the shooks, means for simultaneously operating the feeding means, a device adapted to engage the uppermost shook of each magazine, a reciprocating bar, dogs carried by said bar adapted to engage the feed means for the shooks, means for automatically and directly controlling the position of the dogs and thereby the feed, and means for removing the shooks in succession from the magazines and holding them crosswise in pairs.

44. In a box-making machine, the combination of two magazines for holding shooks, feeding means for the shooks, means for simultaneously operating the feeding means, a device adapted to engage the uppermost shook of each magazine, dogs adapted to engage the feed means for the shooks, rock arm adapted to directly engage the dogs by impact and independently connected to the devices which are adapted to engage the uppermost shook, means for rocking said arms to control the feed of the shooks, and means for removing the shooks in succession from the magazines and holding them crosswise and in pairs.

45. The combination of means for holding shooks, feeding means for the shooks, a device adapted to engage the uppermost shook, a reciprocating bar, a dog carried by said bar adapted to engage the feed means for the shooks, a rock arm adapted to directly engage the dog by impact and independently connected to the device which is adapted to engage the uppermost shook, and means for rocking said arm to control the feed of the shooks.

46. The combination of a plurality of magazines, feeding means including a follower, one for each magazine, means whereby the follower may be lowered in the magazine, a shaft, an arm for each magazine pivotally held to the shaft and adapted to engage each follower, springs tending normally to force the arms in one direction, a lever, and clutch means whereby either arm may be rocked on its pivot to move either of the followers.

47. In a box-making machine, the combination of a plurality of magazines, feeding means including a follower, one for each magazine, means for simultaneously elevating the followers, means whereby the follower may be manually lowered in the magazine independent of the rest of the feeding means, a lever operated means whereby either follower may be elevated, and means for removing the shooks from the magazines in succession and holding them crosswise in pairs.

48. In a box-making machine, the combination of a plurality of magazines, independent feeding means including a follower, for each magazine, means whereby the follower may be lowered in the magazine, a shaft, a lever, and means operated by the shaft for elevating either follower.

49. The combination of independent shook holding means, a carrier, a rotary device having a plurality of suction heads each provided with independent sets of suction devices arranged at angles with respect to each other, means for creating suction in said device, means for moving the suction heads for removing the shooks in succession from the independent shook holding means and for placing them crosswise in pairs, and means whereby the shooks may be deposited in the carrier.

50. In a box-making machine, shook holding means, a rotary device having a plurality of suction heads each having a plurality of sets of suction devices, means for creating suction in said device, and means for moving the suction heads for removing the shooks in succession from the shook holding means to cause each head to hold a pair of shooks crosswise.

51. The combination of shook holding magazines, feeding means for the shooks, together with a rotary and reciprocatory device having a plurality of radially arranged arms, each provided with a head, and angularly arranged sets of suction devices for each head whereby the heads may each be made to remove the shooks in succession and hold them crosswise and in pairs.

52. The combination of shook holding means, together with a device having a plurality of radially arranged arms, each provided with a suction head, and angularly arranged sets of suction cups on each head whereby each head may be made to remove the shooks and hold them crosswise and in pairs.

53. The combination of a plurality of independent shook-holding means and a rotary shook transfer device, comprising a plurality of radially-extending tubular arms, a head carried by each arm, two sets of suction devices carried by each head and arranged transversely of each other and adapted to hold the shooks crosswise and in pairs, means for creating suction in the arms, and valves arranged in the arms and automatically actuated whereby suction may be created to hold the shooks to the heads or the suction cut off to permit the shooks to be discharged therefrom.

54. A transfer device for body material, comprising a plurality of radially-extending tubular arms, a head carried by each arm, two sets of suction devices carried by each head and arranged transversely of each other and adapted to hold the blanks crosswise and in pairs, and means for creating suction in the arms.

55. The combination of shook holding means, a carrier, and a movable transfer device, comprising a plurality of tubular arms, a head carried by each arm, two sets of suction devices carried by each head and arranged transversely of each other and adapted to hold the shooks crosswise and in pairs, means for creating suction in the arms and valves arranged in the arms and automatically actuated whereby suction may be created to hold the shooks to the heads or the suction cut off to permit the shooks to be discharged therefrom into said carrier.

56. The combination of shook holding means, and a rotary device having a head provided with two sets of suction devices arranged at an angle with respect to each other, and means whereby the head may be made to remove the shooks crosswise from the holding means and hold them in pairs.

57. The combination of shook holding means, an intermittently rotary and reciprocatory device having a head provided with two sets of angularly arranged suction devices, and means for moving the head to remove the shooks from the holding means and hold them in pairs.

58. In a box-making machine, the combination of independent shook holding means, a tubular shaft, means for raising and lowering said shaft, a plurality of radial tubular arms connected to said shaft, a head carried by each arm and provided with two sets of suction devices, each adapted to pick up a shook from the shook holding means and having independent passages for the suction devices of each arm, independently movable valves for controlling the passages between the suction devices and said arms, means for creating suction in the arms, means for operating the valves independently, and means for imparting a rotary movement to the arms.

59. The combination of shook holding means, a shaft, means for raising and lowering said shaft, a plurality of tubular arms connected to said shaft, a head carried by each arm and provided with two sets of suction devices, each adapted to hold shooks cross-wise and having an independent passage for the suction devices of each arm, said suction devices being adapted to pick up shooks from the shook holding means, valves for controlling the passages between the suction devices and said arms, means for creating suction in the arms, means for operating the valves, and means for imparting a rotary movement to the shaft and arms.

60. In a box-making machine, the combination of independent shook holding means, a tubular shaft, means for raising and lowering said shaft, a head communicating with said shaft and provided with two sets of cup-shaped suction devices and independent passages for the suction devices, said suction devices being adapted to remove shooks from the shook holding means, valves for controlling the passages between the suction devices and said arms, and means for creating suction in the arms.

61. The combination of independent holding and feeding means for body material, and a rotary device for independently removing the shooks in succession and having a head provided with two independent sets of suction devices, and means for controlling the suction of said devices.

62. The combination of independent holding and feeding means for veneer shooks, and a device for independently removing the shooks in succession and having a head provided with two independent sets of suction devices, and means for controlling the suction of said devices.

63. The combination of a magazine, means for feeding blanks or shooks upward in said magazine, a device having a plurality of heads each adapted to remove shooks from the magazine, each head being provided with two sets of suction devices arranged transversely of each other, each suction device being cup-shaped and having an independent communication with said head, said head having independent passages for each set of suction devices, tubular arms carrying said heads, and means for controlling the suction in said devices.

64. The combination of a plurality of magazines, means for feeding the shooks upward in said magazines, a device having a plurality of heads, each provided with two sets of suction devices arranged transversely of each other, each suction device being cup-shaped and having an independent communication with said head, said head having independent passages for the sets of suction devices, tubular arms carrying said heads, two valves, one operated through the other and each controlling one of the passages from one of the sets of the suction devices, springs normally forcing the valves in one direction, and means for forcing the valves in the other direction.

65. The combination of a plurality of magazines, means for feeding the shooks upward in said magazines, a device having a plurality of heads, each provided with two sets of suction devices arranged transversely of each other, said head having independent passages for the sets of suction devices, tubular arms carrying said heads, two valves, each controlling one of the passages from one of the sets of the suction devices, springs normally forcing the valves in one direction, a rod for forcing the valves of each arm to an open position, arms for operating the rods, and means for imparting a rotary movement to the arms and heads.

66. The combination of a plurality of magazines, means for feeding the shooks upward in said magazines, a device having a plurality of heads, each provided with two sets of suction devices arranged transversely of each other, tubular arms carrying said heads, two independently movable valves, one operated through the other and each controlling one of the passages from one of the sets of the suction devices, springs normally forcing the valves in one direction, a rod for forcing the valves of each arm to an open position, means for operating the rods, means for imparting a rotary movement to the arms and heads, and means for reciprocating the device to force the heads in succession into the magazines.

67. The combination of a plurality of independent shook holding means, feeding means for the shooks, a rotary device for removing the shooks in succession from the independent holding means, together with means for reciprocating the rotary device and simultaneously acting to control the feed of the shooks.

68. The combination of shook holding means, feeding means for the shooks, a device having two sets of suction cups arranged at right angles to each other for removing the shooks in succession from the holding means and holding them crosswise, together with means for reciprocating the device and simultaneously acting to control the feed of the shooks.

69. The combination of two magazines, means for feeding shooks upward in said magazines, a rotary device having suction heads, means for creating suction in said heads, a drive shaft, means for rotating the device and said shaft, and a rock shaft connected to the rotary means of the device whereby the latter may be given an up and down movement to cause the heads to successively enter the magazines and remove the shooks therefrom.

70. The combination of a magazine, means for feeding shooks upward in said magazine, a rotary device having suction heads each provided with sets of angularly arranged suction devices, means for creating suction in said heads, and means whereby the device may be given an up and down movement to cause the heads to enter the magazine and remove the shooks therefrom.

71. The combination of two magazines, means for feeding shooks upward in said magazines, a rotary device having suction heads each having two sets of angularly arranged suction devices, and means whereby the device may be given an up and down movement to cause the heads to successively enter the magazines and remove the shooks therefrom.

72. The combination of holding means for box blanks, means for removing the blanks and holding the same crosswise, a carrier having a plurality of independent receiving means each having movable elements for the blanks into which the latter are deposited crosswise, and means for imparting an intermittent rotary movement to the carrier to convey the blanks to the box-forming means.

73. A carrier having a plurality of independent receivers for shooks and adapted to hold the same crosswise, means for placing the shooks crosswise in the receivers of the carrier, pivotally held elements adapted to support the shooks at their ends and located in each receiver, and means for automatically actuating the elements to aline the shooks.

74. A carrier having a plurality of independent receivers, and independently movable elements in each receiver adapted to receive and at the same time support box blanks crosswise in pairs and engage said blanks at their end edges to move the blanks edgewise and aline the same.

75. A carrier having a receiver provided with four pivotally held elements adapted to receive and support shooks crosswise and in pairs and engage the shooks at their end edges and move the same lengthwise to aline the same.

76. A carrier having a plurality of independent receivers for shooks and adapted to hold the same crosswise, means for placing the shooks crosswise in the receivers of the carrier, and movably held elements adapted to support the shooks at their ends and located in each receiver.

77. A carrier having a plurality of receivers each receiver having four pivotally held alining elements adapted to support shooks crosswise, and means for automatically moving said elements to aline the shooks.

78. The combination of shook-holding means, means for transferring the shooks, and a carrier for receiving the shooks from the transfer means and for conveying the same to the box-forming means, said carrier comprising a plurality of receivers, two pivotally held elements for each shook arranged in each receiver adapted to support the shooks crosswise of each other and at their ends, rods connecting the elements in pairs, springs tending normally to force the elements in one direction, and independently movable cams adapted to move the rods and swing the elements of each receiver independent of the rotary movement of the carrier to aline the shooks, and means for rotating the carrier to place the shooks adjacent to the box-forming means.

79. A carrier having a receiver, a plurality of pivotally held elements adapted to support box shooks crosswise of each other and at their ends, rods connecting the elements in pairs, and means for operating the rods to aline the shooks.

80. The combination of shook-holding means, means for transferring the shooks, and a carrier for receiving the shooks from the transfer means and for conveying the same to the box-forming means, said carrier comprising a plurality of receivers, a plurality of pivotally held elements for each shook arranged in each receiver adapted to support the shooks crosswise of each other, rods connecting the elements in pairs, springs tending normally to force the elements in one direction, and means adapted to move the rods and swing the elements of each receiver independent of the movement of the carrier to aline the shooks.

81. The combination of shook-holding means, and a carrier for the shooks for conveying the same to the box-forming means, said carrier comprising a plurality of receivers, movable elements arranged in each receiver adapted to support the shooks, rods connecting the elements in pairs, springs tending normally to force the elements in one direction, independently movable means adapted to move the rods and the elements of each receiver independent of the rotary movement of the carrier to aline the shooks, and means for rotating the carrier to place the shooks adjacent to the box-forming means.

82. In a box-making machine, the combination of transfer means for box blanks, a magazine, a main feed in the magazine, a supplemental feed also in the magazine, and means whereby the supplemental feed may be placed in operative position by the main feed.

83. In a box-making machine, the combination of transfer means for box blanks, a magazine, a main feed including a follower, a supplemental feed, and means whereby the supplemental feed may be placed in operative position by the follower.

84. In a box-making machine, a plurality of magazines each having a vertically arranged screw with two separate feed portions, a follower adapted to engage one portion, means for rotating the screw, devices forming a supplemental feed and movable by the upper part of the screw, and means for automatically throwing the devices into operative position to provide a supplemental feed and controlled by the movement of the follower.

85. The combination of means for supporting body material, a pneumatic device adapted to remove the body material and hold it crosswise and in pairs, means for creating suction in said device, to act independently on each body material element, means for cutting off the suction means, and a plate-like element for relieving any suction in said device.

86. The combination of means for holding body material, a rotary suction device having means to remove the body material and hold it crosswise and in pairs and having openings therein, a yielding plate normally closing said openings and a fixed cam means for raising said plate to permit air to pass through the openings to relieve the suction within the device.

87. The combination of means for supporting material and a pneumatic device having a plurality of suction devices of relatively different lengths and arranged to present a curved surface.

88. The combination of means for supporting body material, and a pneumatic device having two sets of cup-shaped suction elements arranged at angles and each set having the elements of relatively different lengths and arranged to present a curved surface, and means for creating suction in said device.

This specification signed and witnessed this 11th day of November, A. D. 1912.

CHARLES BURNHAM.

Witnesses:
Wm. H. Burnham,
R. M. Kenny.